Figure 1:
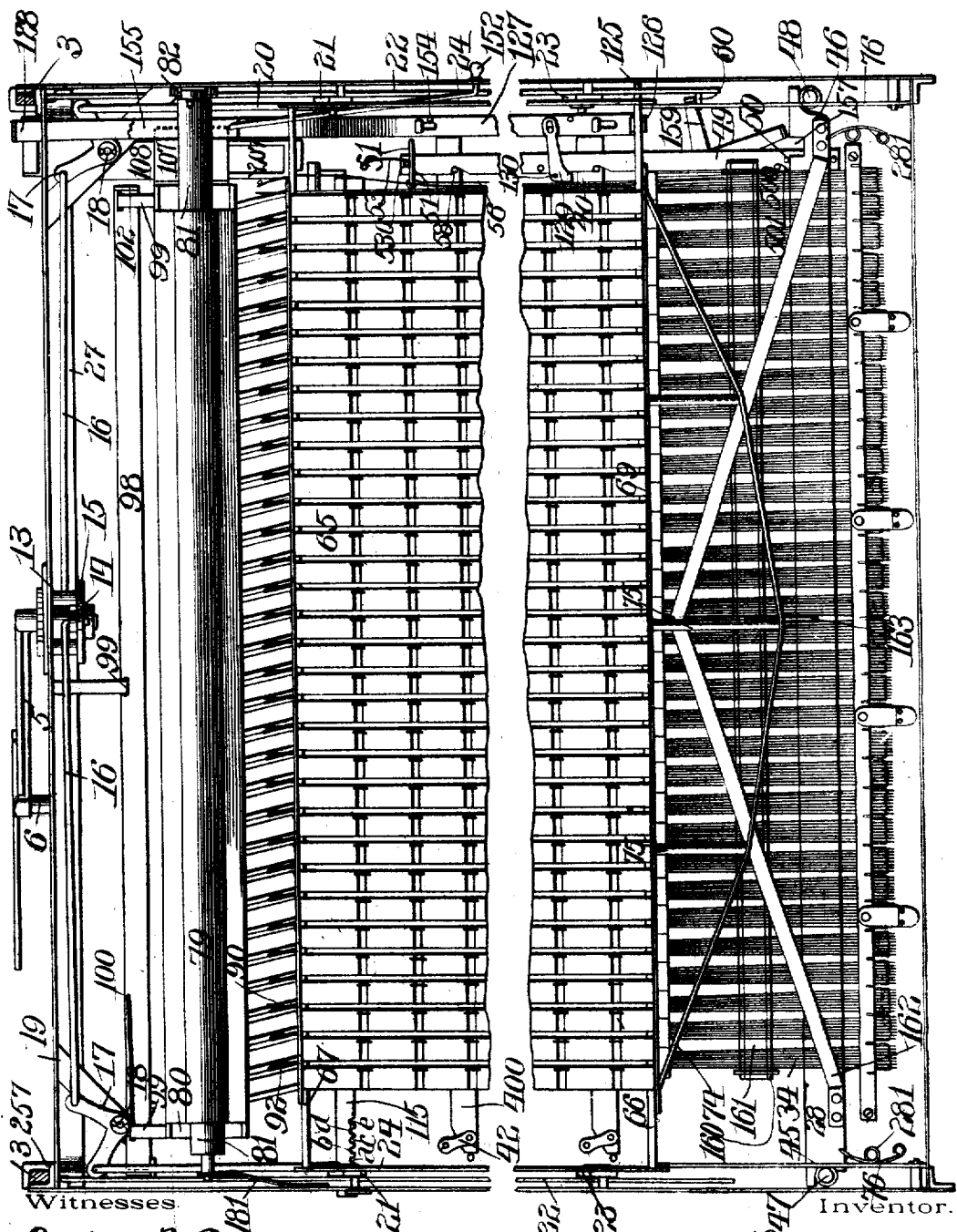

A. J. GILLESPIE.
VOTING MACHINE.
APPLICATION FILED JUNE 28, 1902.

995,424.

Patented June 13, 1911.
24 SHEETS—SHEET 1.

Witnesses
Walter B. Payne,
G. Willard Rich.

Inventor.
Alfred J. Gillespie
by Frederick H. Church
his Attorney

A. J. GILLESPIE.
VOTING MACHINE.
APPLICATION FILED JUNE 28, 1902.
995,424.
Patented June 13, 1911.
24 SHEETS—SHEET 2.
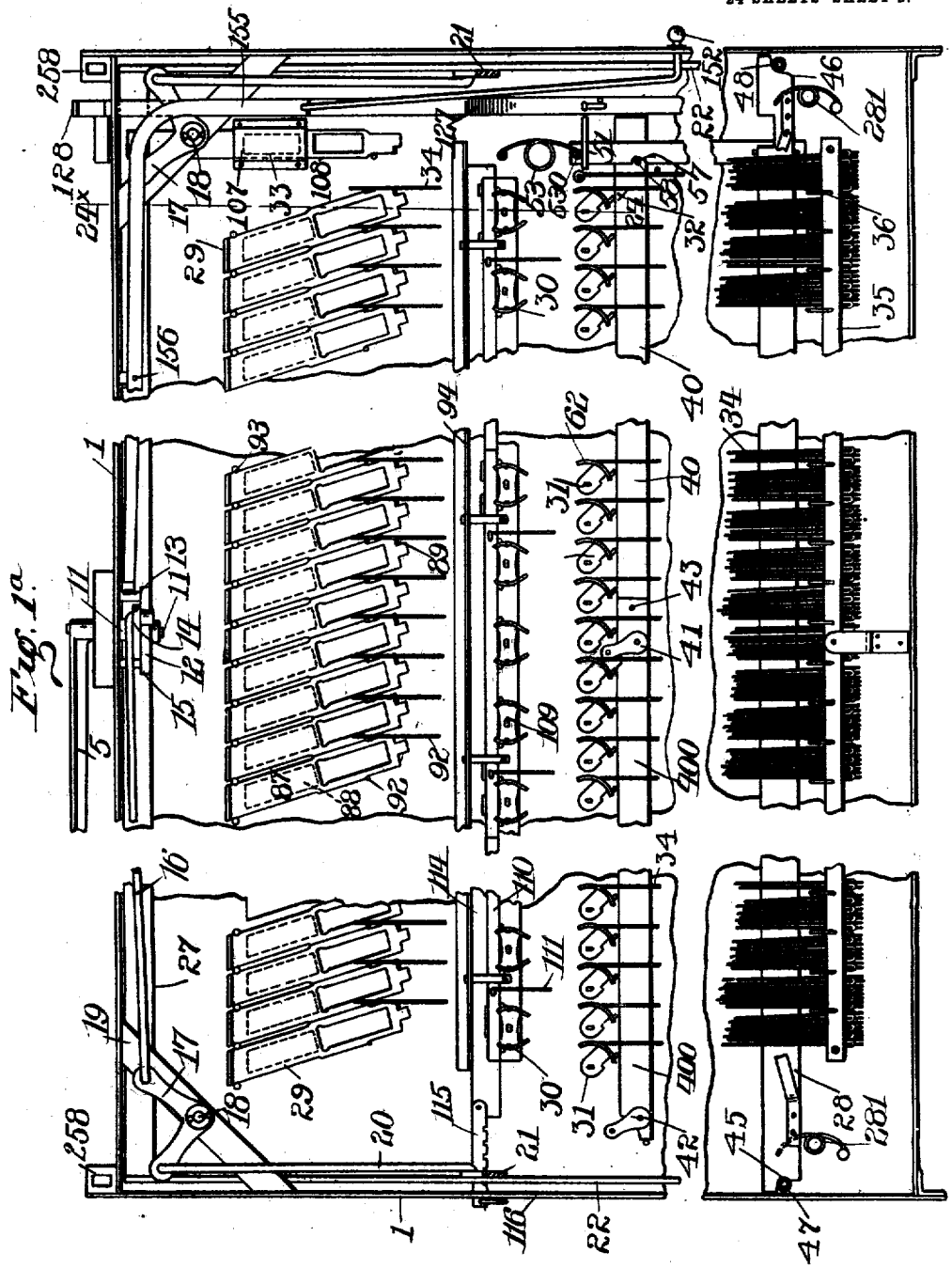

A. J. GILLESPIE.
VOTING MACHINE.
APPLICATION FILED JUNE 28, 1902.
995,424.
Patented June 13, 1911.
24 SHEETS—SHEET 3.
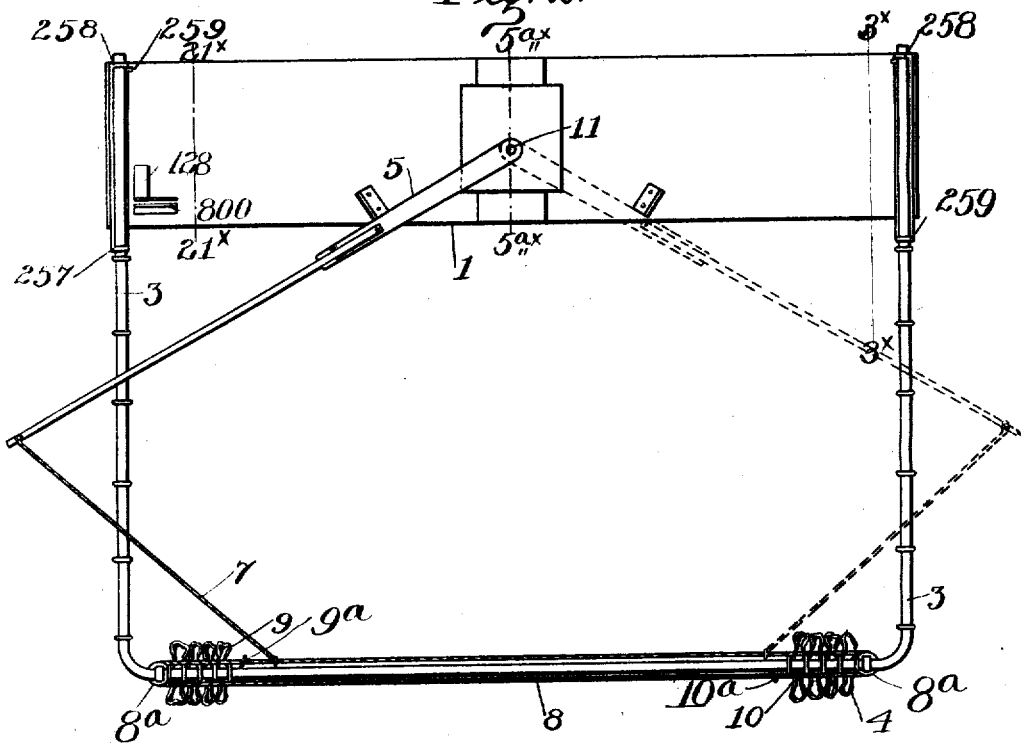
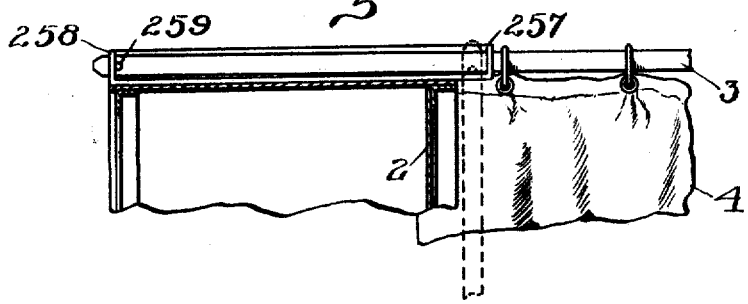
WITNESSES:
Walter B. Payne
G. Willard Rich
INVENTOR
Alfred J. Gillespie
BY
Frederick S. Church
his ATTORNEY A. J. GILLESPIE.
VOTING MACHINE.
APPLICATION FILED JUNE 28, 1902.
995,424.
Patented June 13, 1911.
24 SHEETS—SHEET 4.
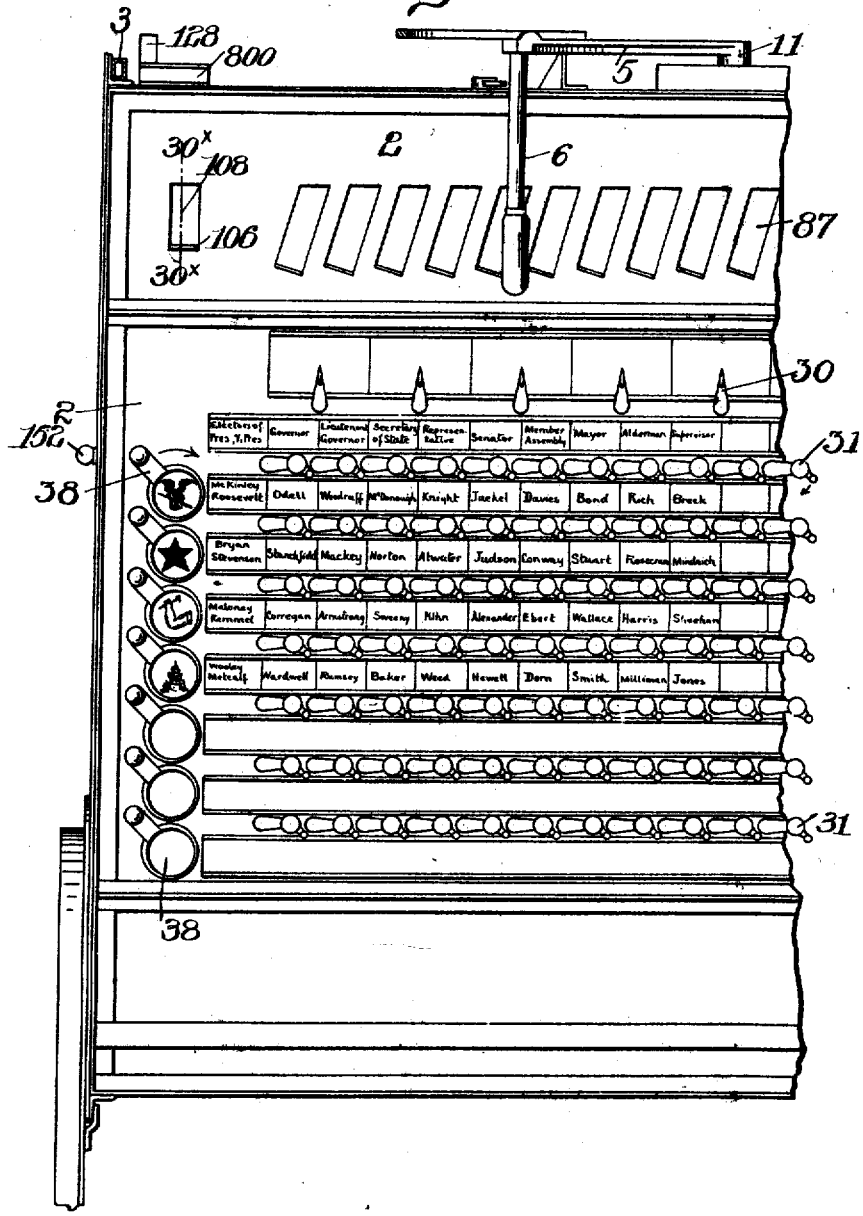

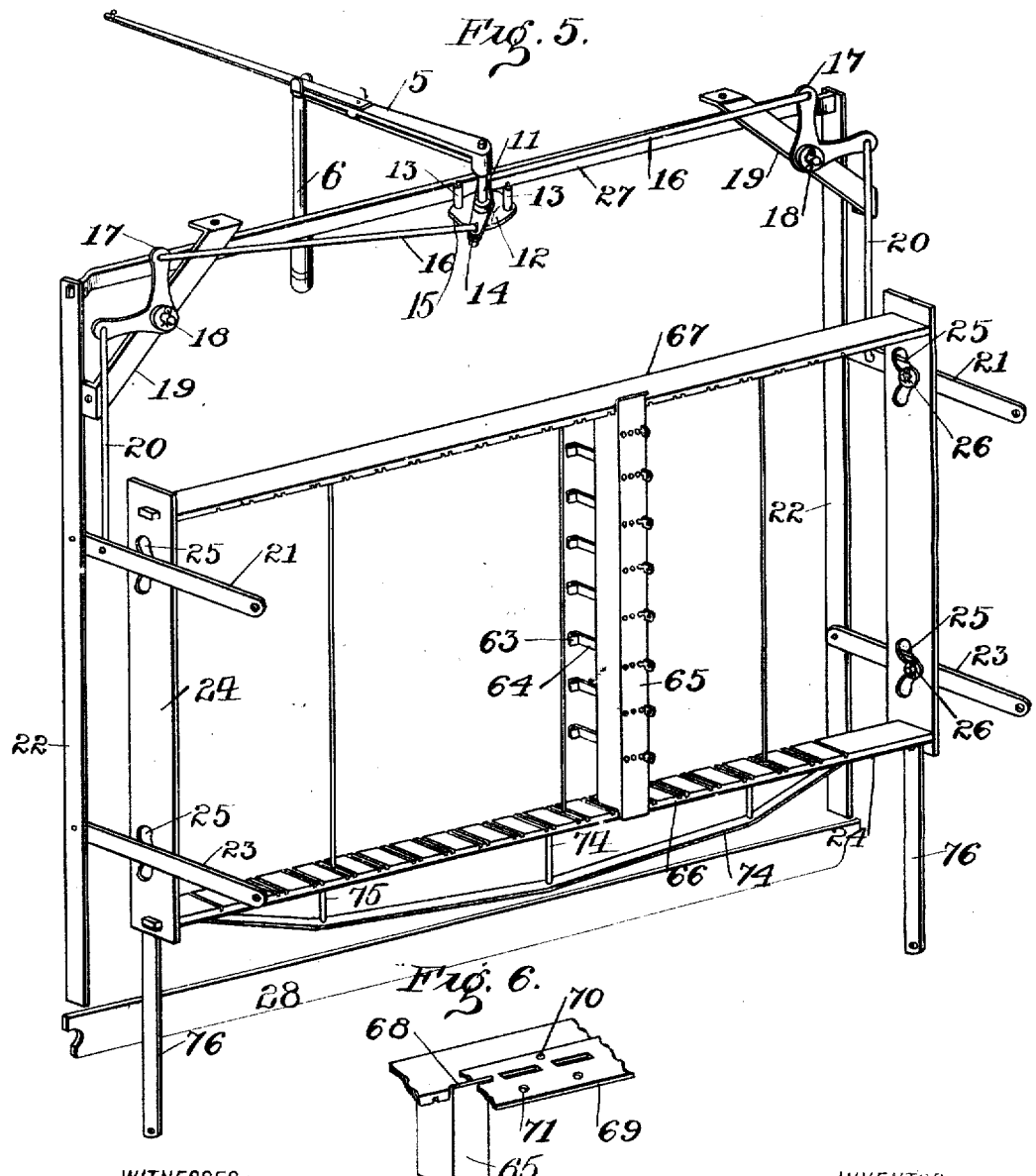

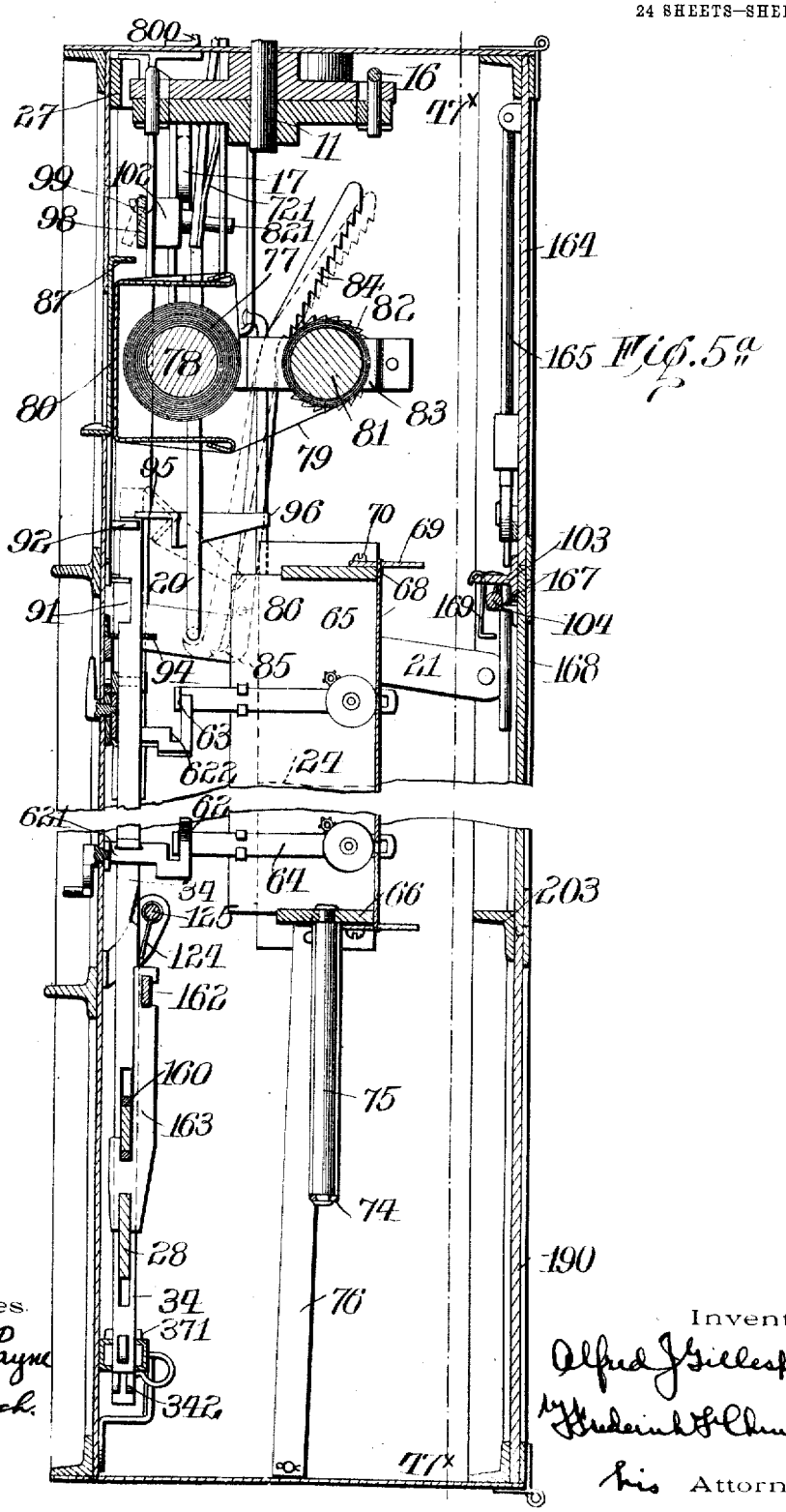

A. J. GILLESPIE.
VOTING MACHINE.
APPLICATION FILED JUNE 28, 1902.

995,424.

Patented June 13, 1911.
24 SHEETS—SHEET 7.

WITNESSES:

INVENTOR

ATTORNEY

A. J. GILLESPIE.
VOTING MACHINE.
APPLICATION FILED JUNE 28, 1902.
995,424.
Patented June 13, 1911.
24 SHEETS—SHEET 8.
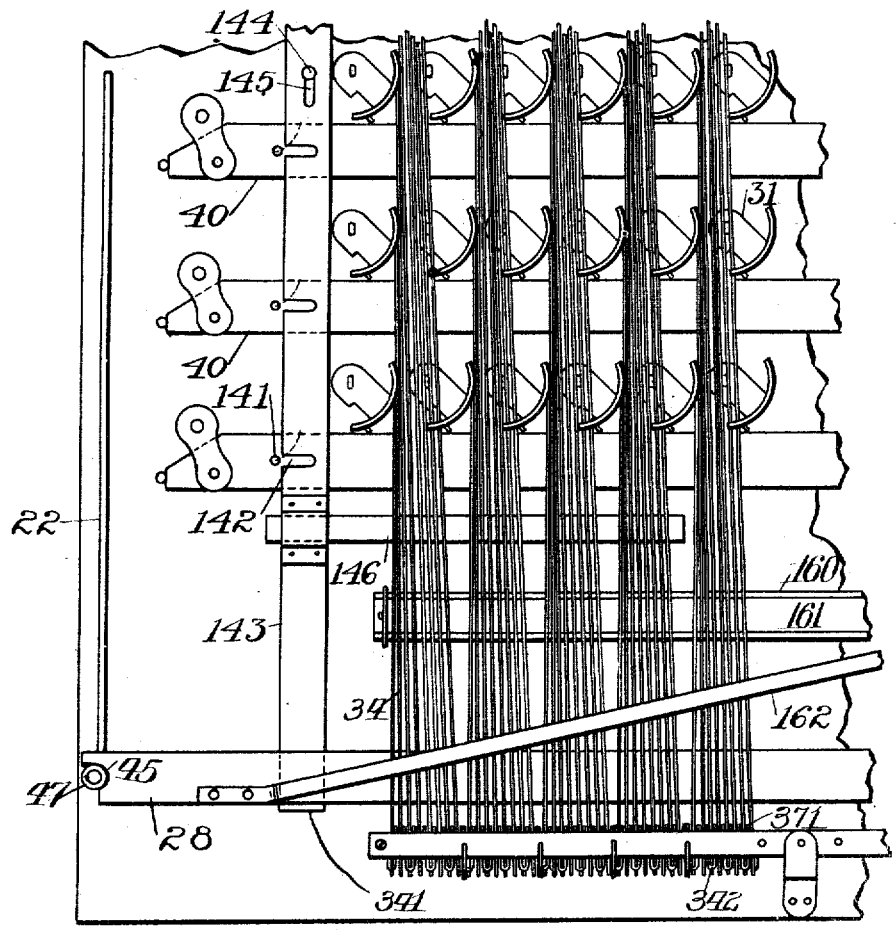
Fig. 9.
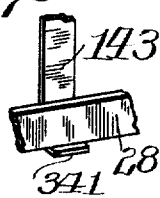
Fig. 10ª
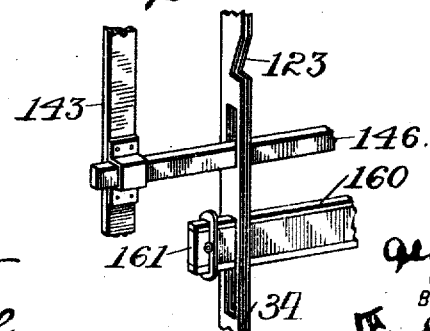
Fig. 10.
WITNESSES:
Walter B. Payne
G. Willard Rick
INVENTOR
Alfred J. Gillespie
BY
Frederick L. Church
ATTORNEY

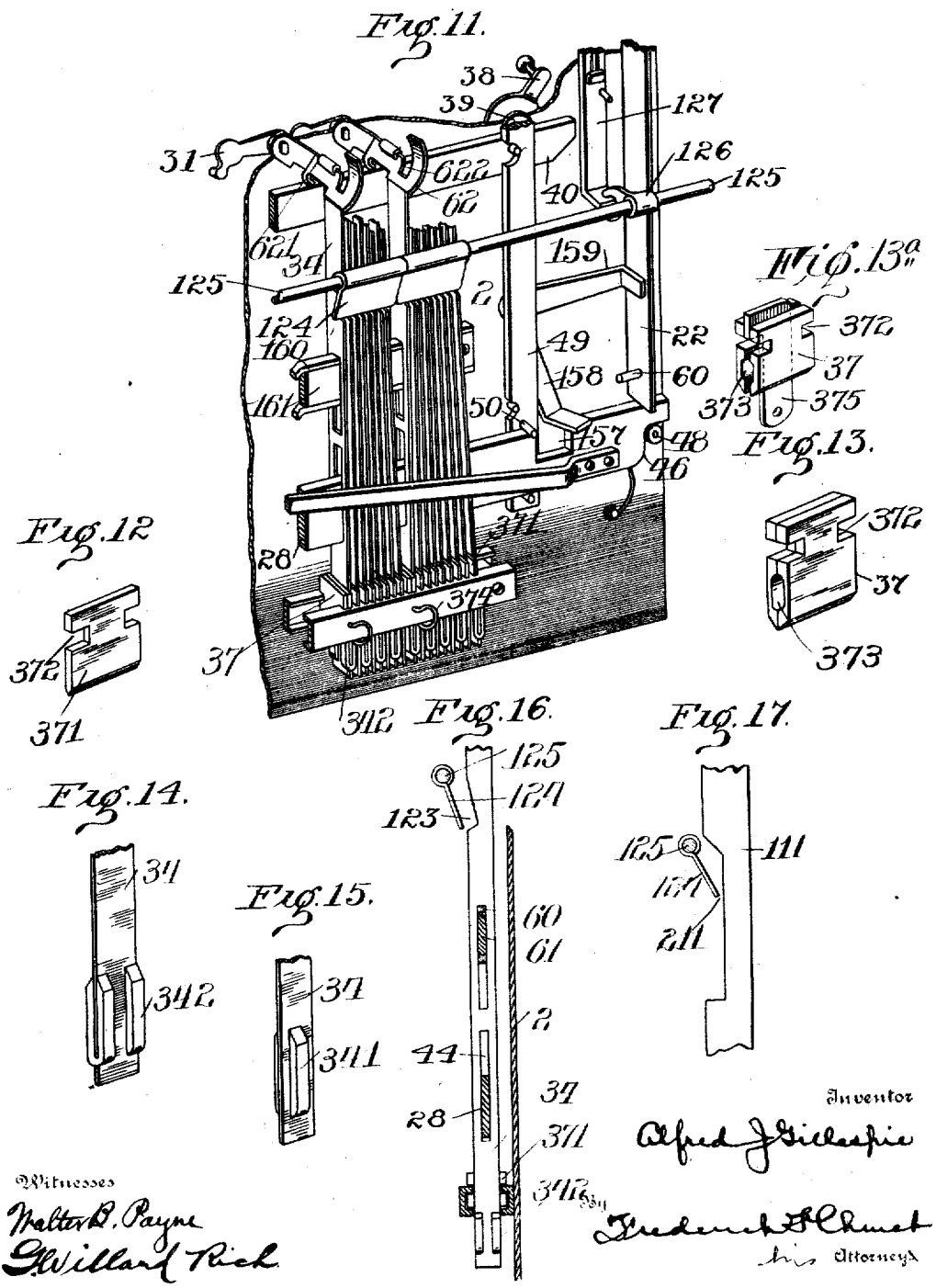

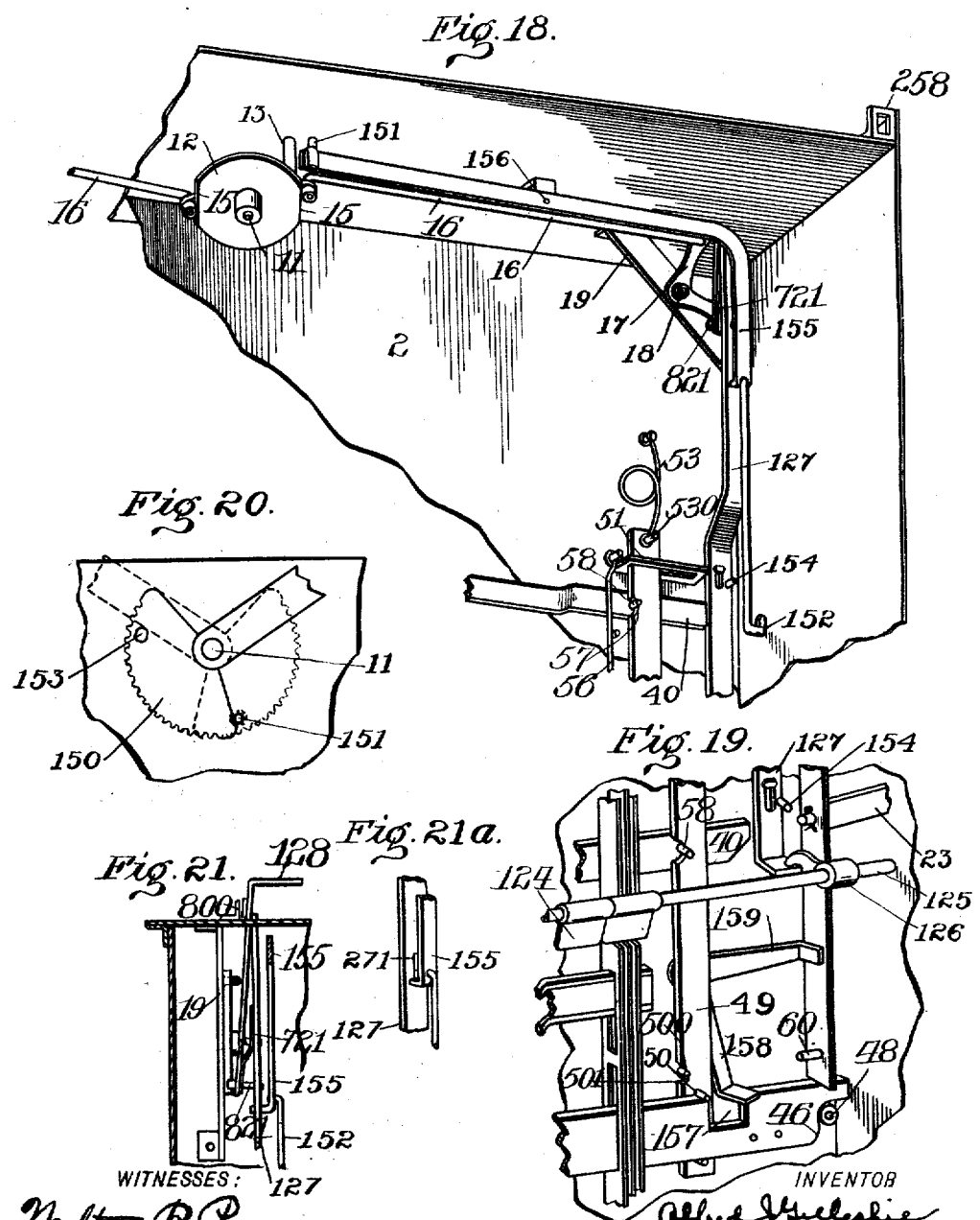

A. J. GILLESPIE.
VOTING MACHINE.
APPLICATION FILED JUNE 28, 1902.

995,424.

Patented June 13, 1911.
24 SHEETS—SHEET 11.

Witnesses
Walter B. Payne
G. Willard Rich

Inventor
Alfred J. Gillespie
By Frederick S. Church
his Attorney

A. J. GILLESPIE.
VOTING MACHINE.
APPLICATION FILED JUNE 28, 1902.

995,424.

Patented June 13, 1911.
24 SHEETS—SHEET 12.

WITNESSES:

INVENTOR

ATTORNEY

A. J. GILLESPIE.
VOTING MACHINE.
APPLICATION FILED JUNE 28, 1902.

995,424.

Patented June 13, 1911.
24 SHEETS—SHEET 13.

WITNESSES:
Walter B. Payne
E. Willard Rick

INVENTOR
Alfred J. Gillespie
BY
Frederick H. Church
ATTORNEY

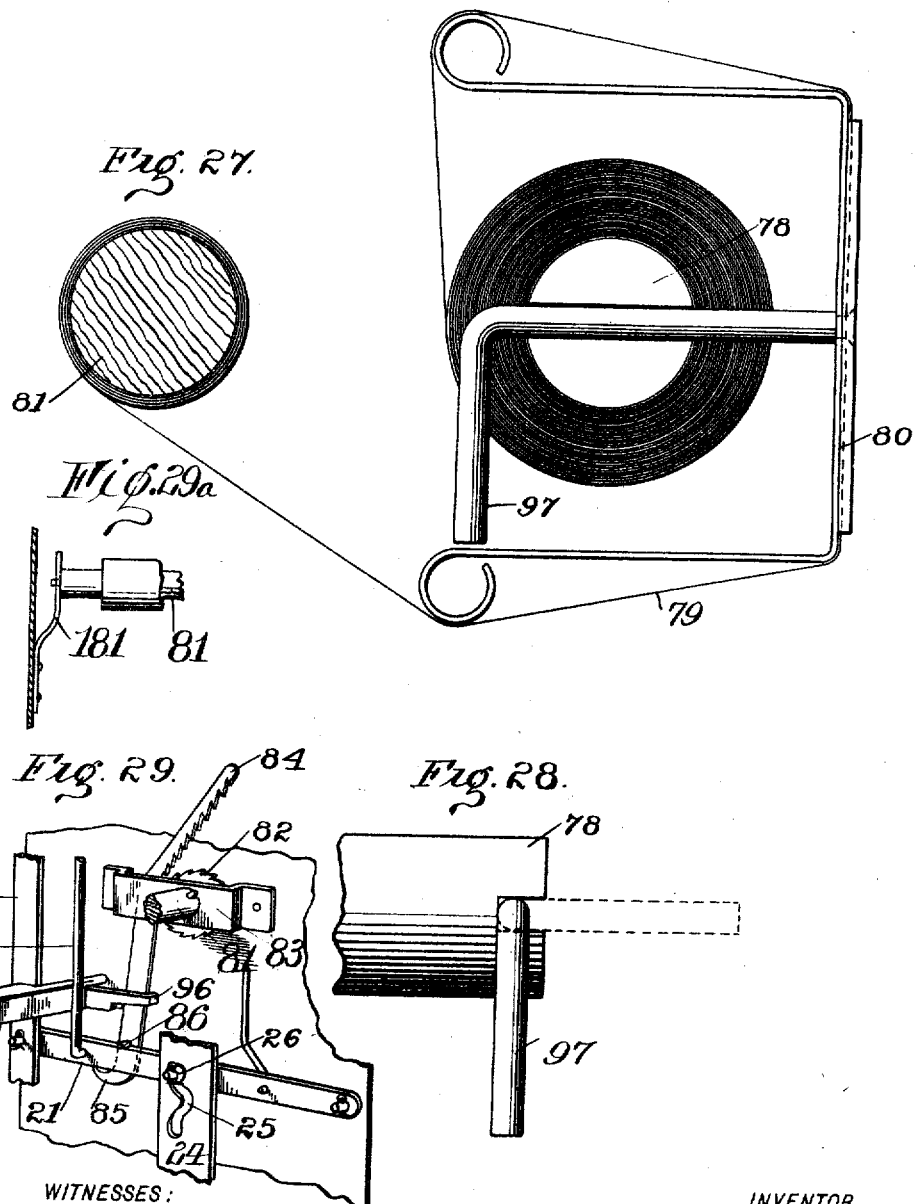

A. J. GILLESPIE.
VOTING MACHINE.
APPLICATION FILED JUNE 28, 1902.
995,424.
Patented June 13, 1911.
24 SHEETS—SHEET 15.
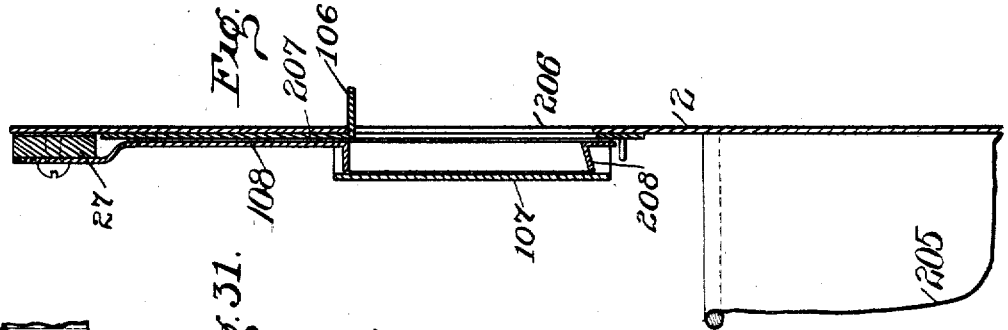
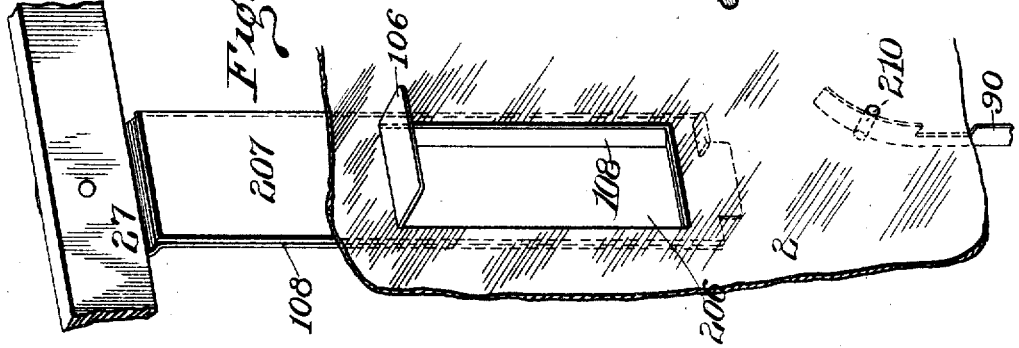
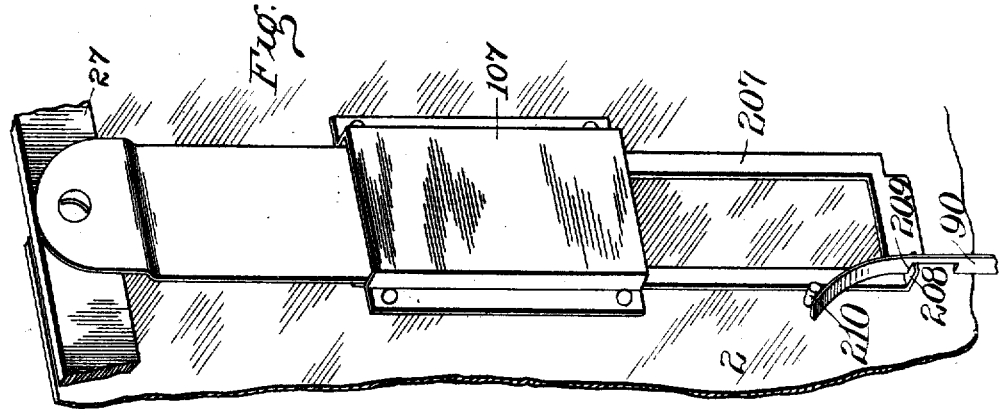
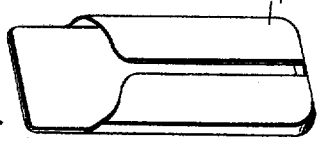
WITNESSES:
Walter B. Payne.
G. Willard Pish.
INVENTOR
Alfred J. Gillespie
BY
Frederick F. Church
His ATTORNEY

A. J. GILLESPIE.
VOTING MACHINE.
APPLICATION FILED JUNE 28, 1902.

995,424.

Patented June 13, 1911.
24 SHEETS—SHEET 16.

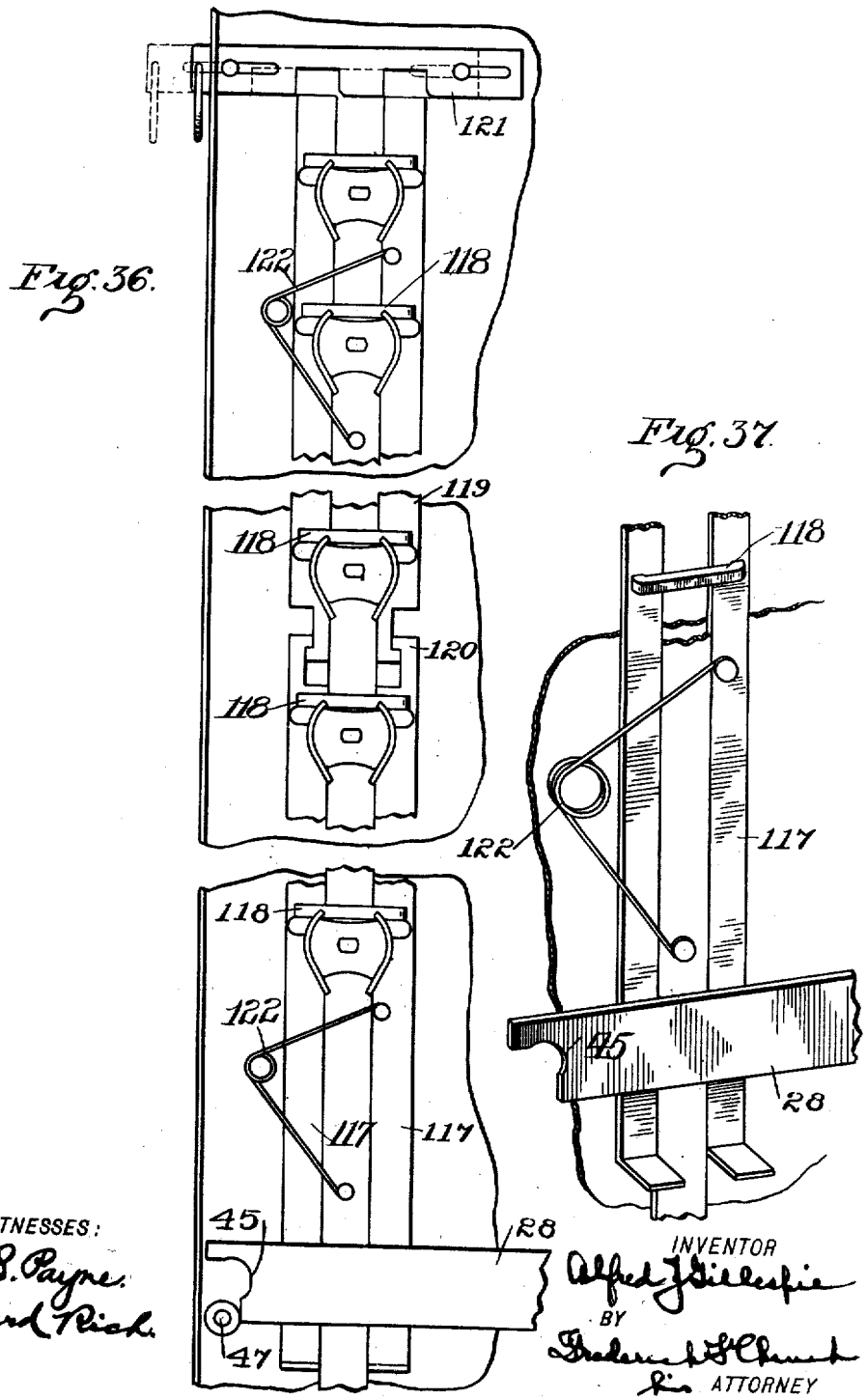

A. J. GILLESPIE.
VOTING MACHINE.
APPLICATION FILED JUNE 28, 1902.

995,424.

Patented June 13, 1911.
24 SHEETS—SHEET 18.

Witnesses
Walter B. Payne
G. Willard Rich

Inventor
Alfred J. Gillespie
By Frederick S. Church
his Attorney

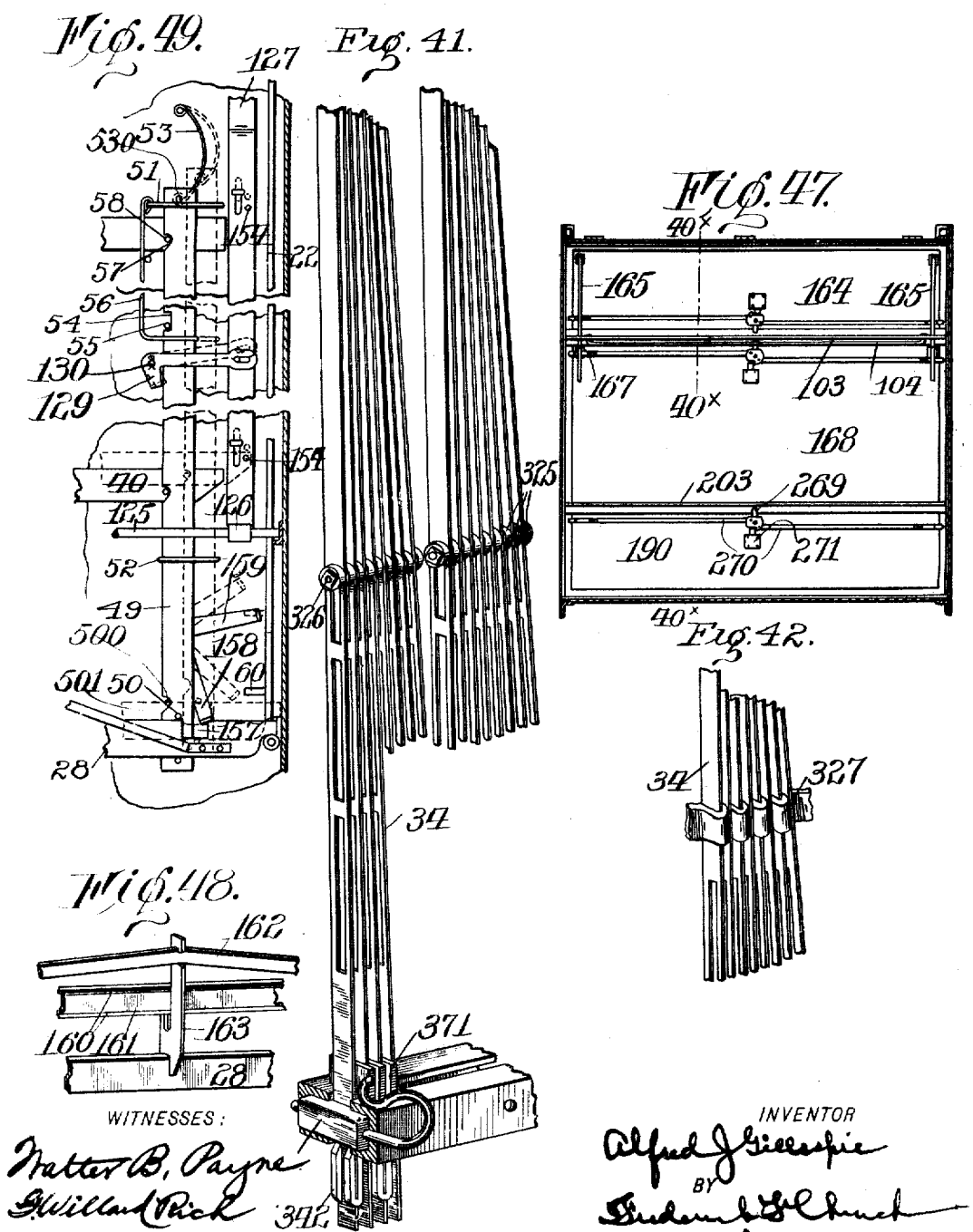

A. J. GILLESPIE.
VOTING MACHINE.
APPLICATION FILED JUNE 28, 1902.
995,424.
Patented June 13, 1911.
24 SHEETS—SHEET 20.
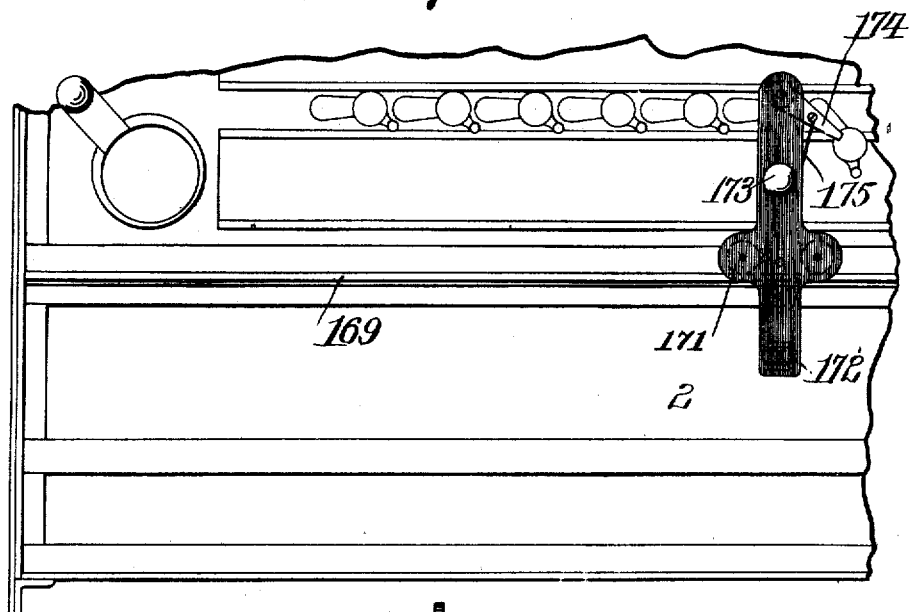
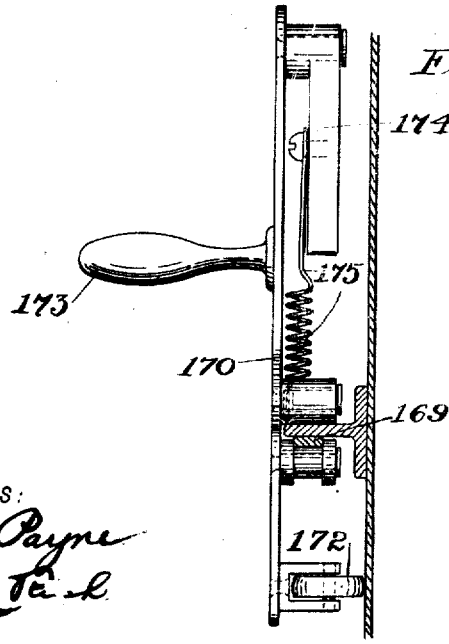
WITNESSES:
INVENTOR
BY
ATTORNEY

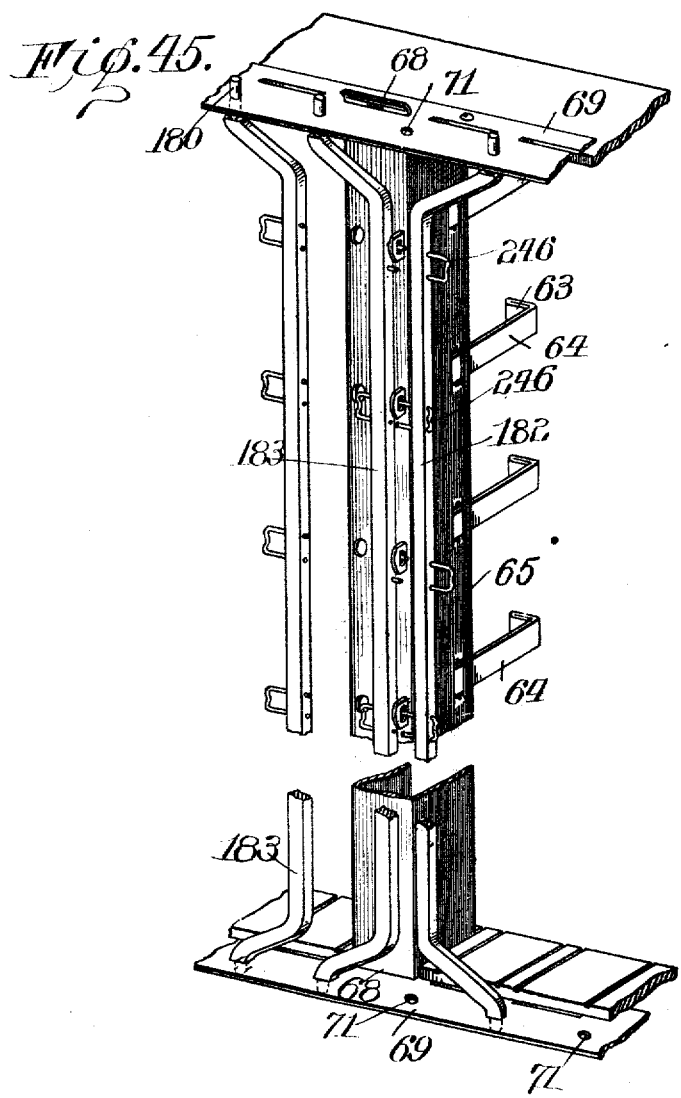

A. J. GILLESPIE.
VOTING MACHINE.
APPLICATION FILED JUNE 28, 1902.
995,424.
Patented June 13, 1911.
24 SHEETS—SHEET 22.
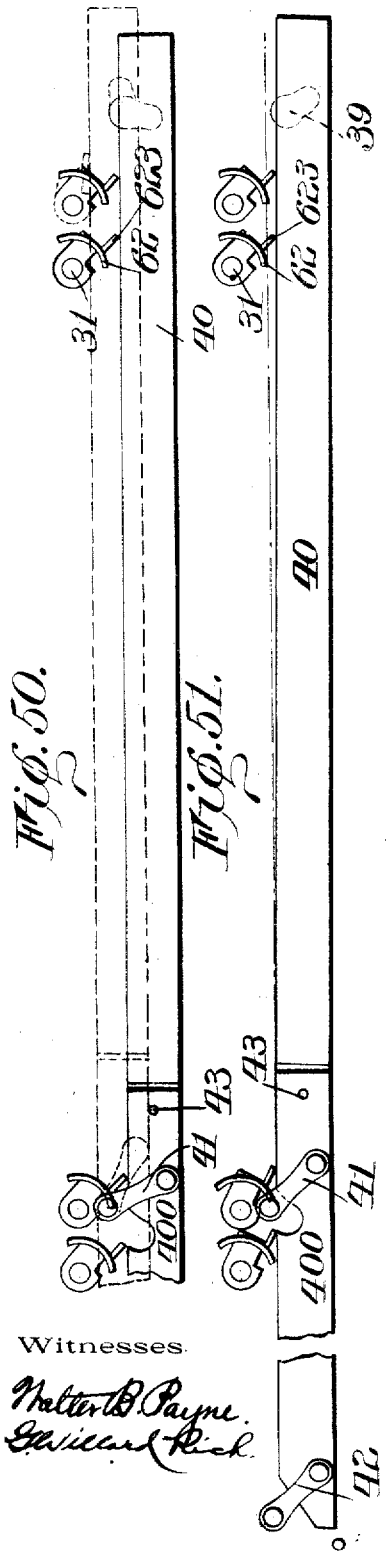
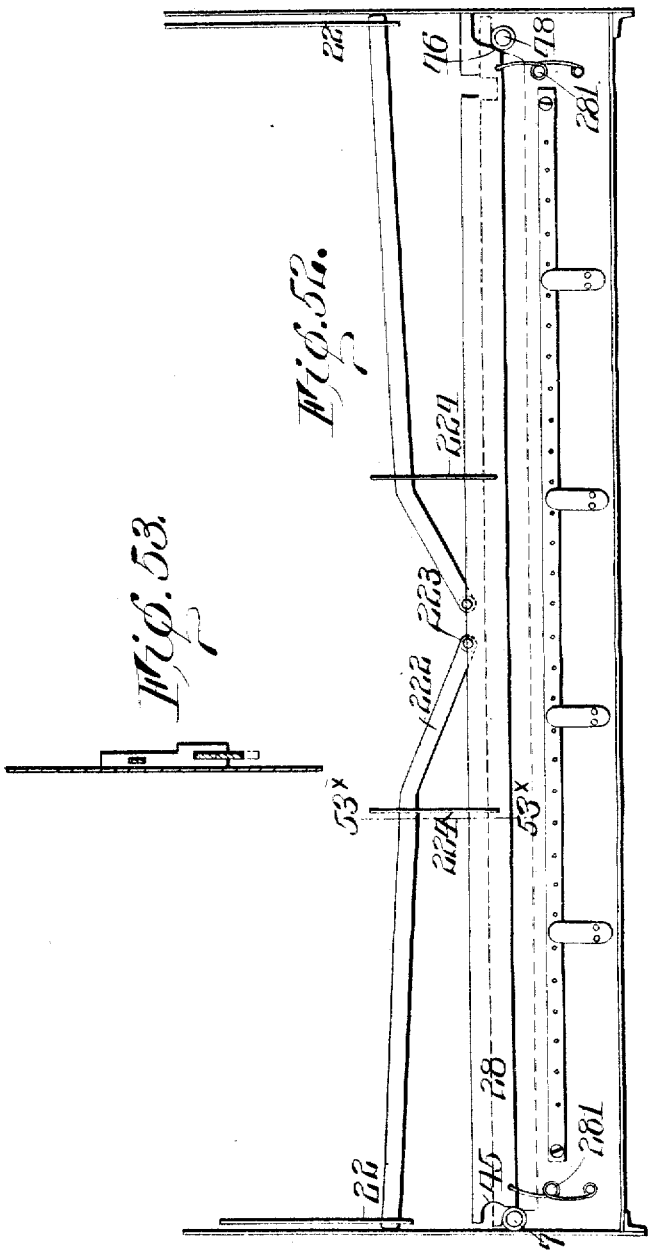

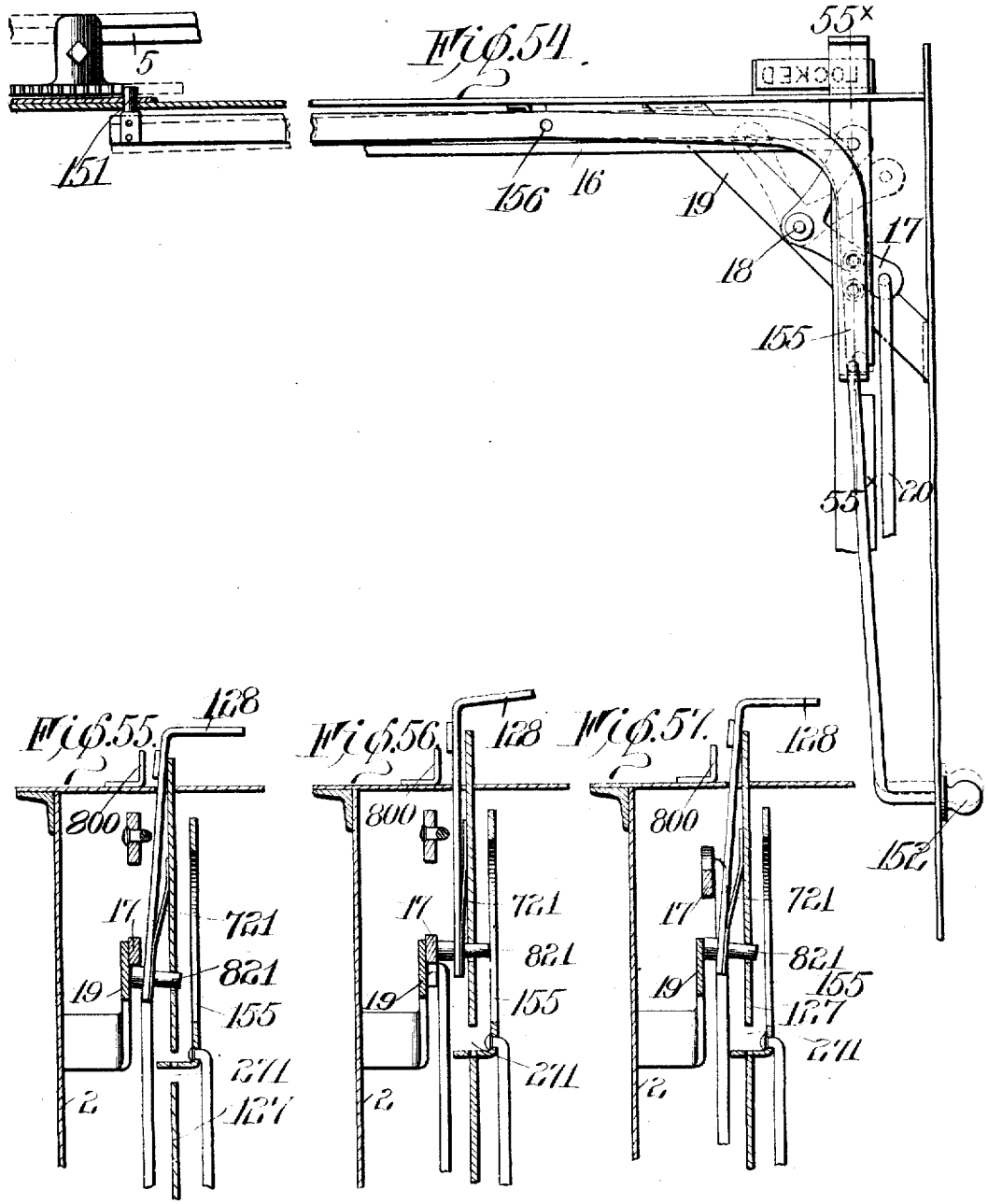

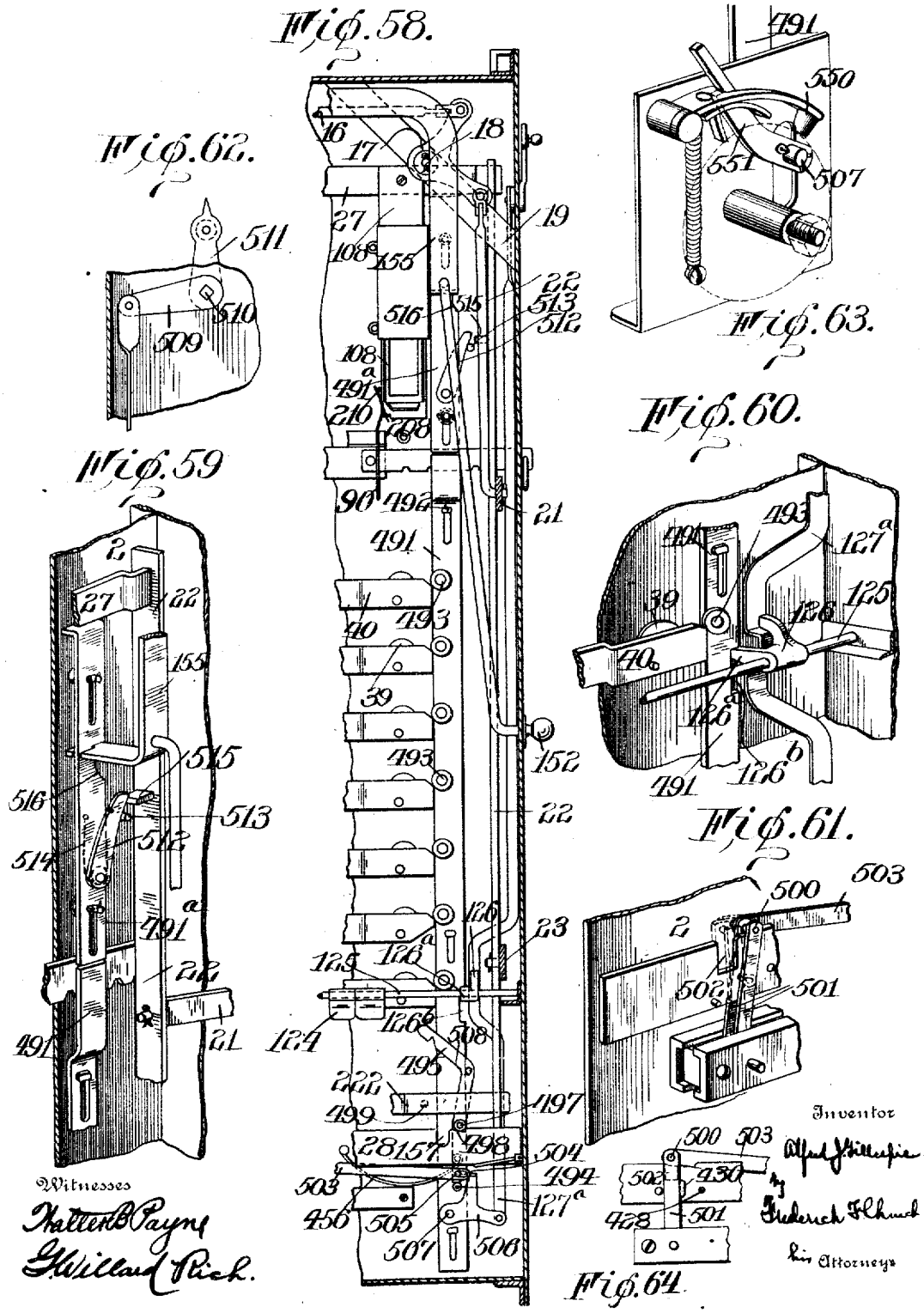

UNITED STATES PATENT OFFICE.

ALFRED J. GILLESPIE, OF JAMESTOWN, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

995,424.   Specification of Letters Patent.   Patented June 13, 1911.

Application filed June 28, 1902. Serial No. 113,686.

*To all whom it may concern:*

Be it known that I, ALFRED J. GILLESPIE, of Jamestown, in the county of Chautauqua and State of New York, have invented certain new and useful Improvements in Voting-Machines; and I do hereby declare the following to be a full, clear, and exact description of the same, reference being had to the accompanying drawings, forming a part of this specification, and to the reference-numerals marked thereon.

My present invention relates to voting machines of the type contained in my prior Patent No. 647,657 and has for its object to improve the construction and operation and to provide a machine of the type mentioned in which the party rows of ballot indicators or keys are arranged horizontally instead of vertically.

My invention has further for its object to provide certain improvements and attachments all as will be hereinafter described and the novel features pointed out in the claims at the end of this specification.

Figure 7:
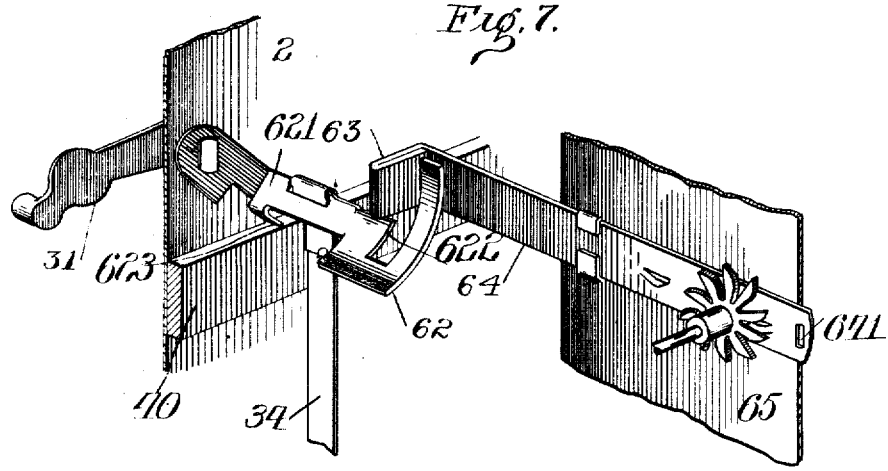
Figure 8:
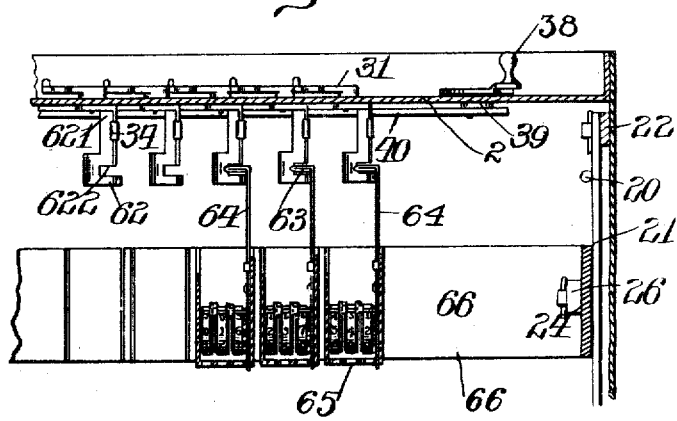
Figure 22:
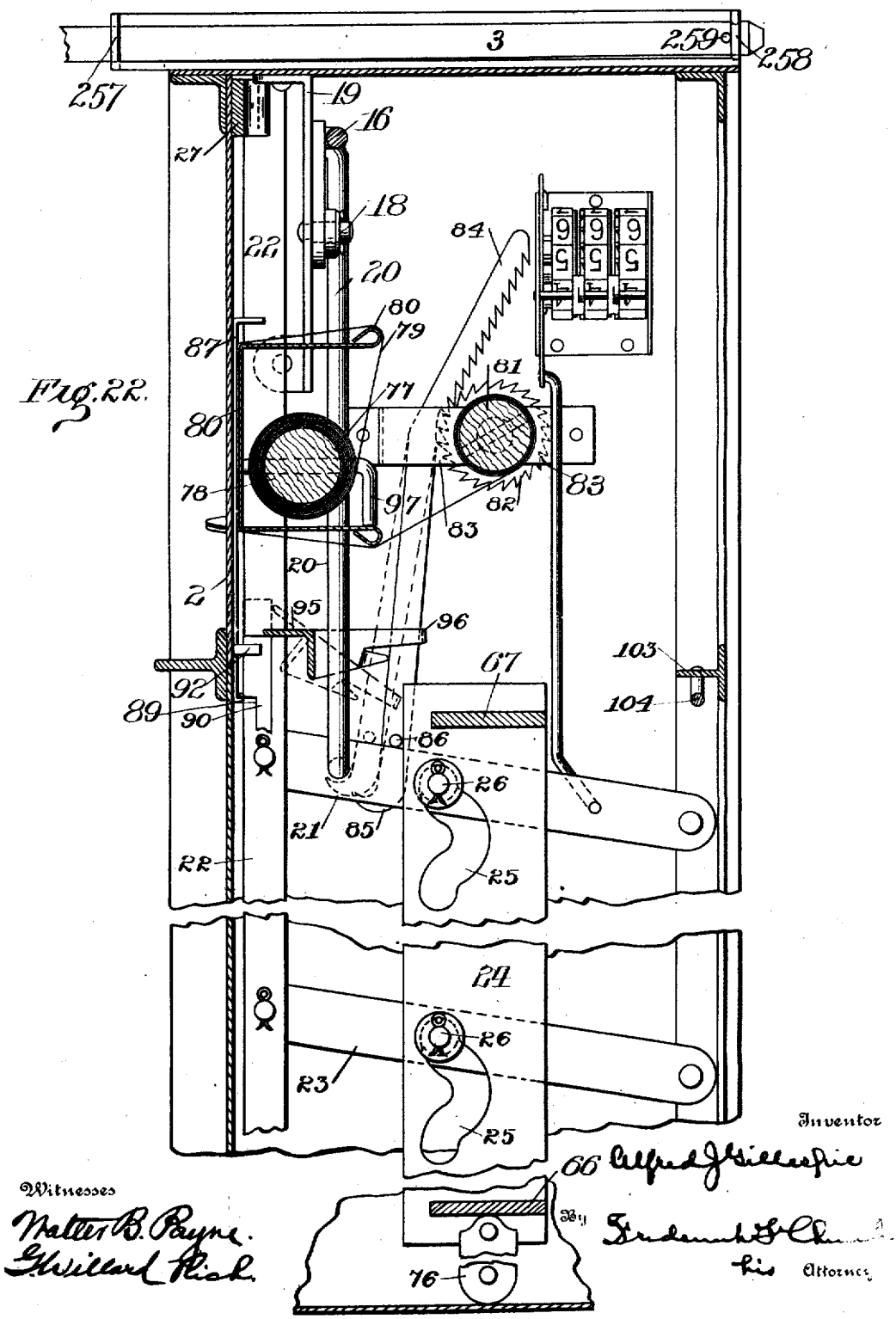
Figure 23:
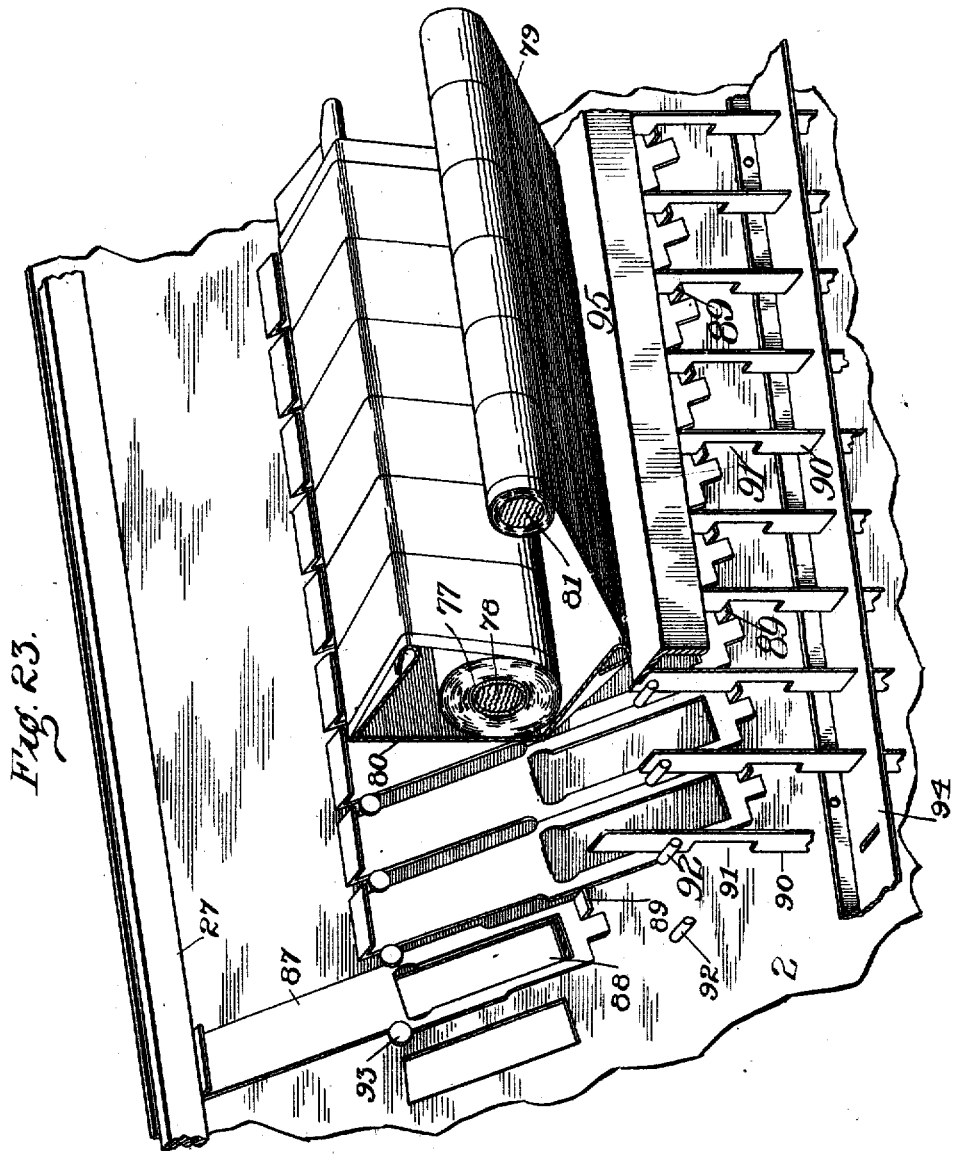
Figure 24:
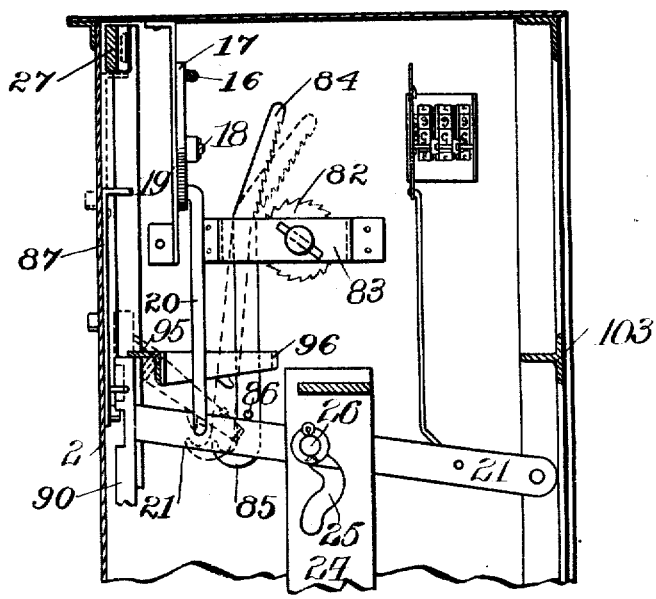
Figure 25:
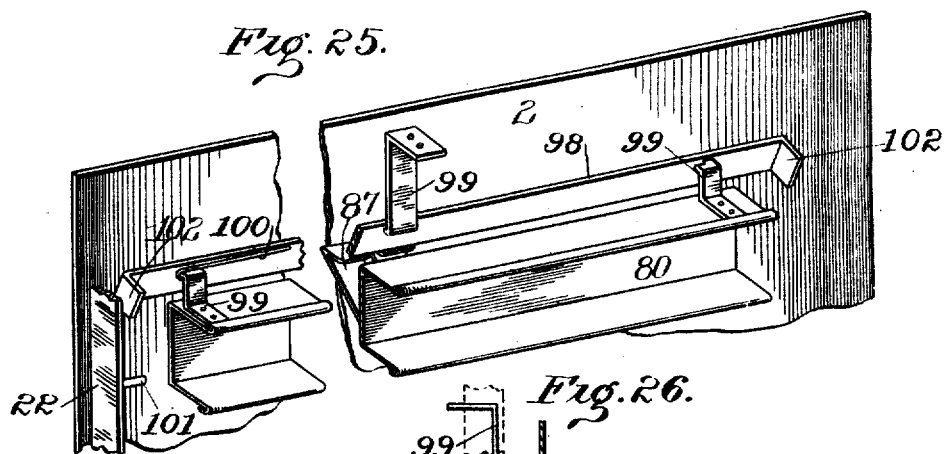
Figure 26:
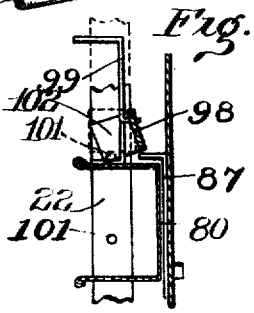

In the accompanying drawings: Figure 1, is a view of the machine looking from the rear with the doors or covers removed. Fig. 1ª, is a rear elevation with the rear doors, registers of counters and their supports and the irregular ballot roll removed. Fig. 2, is a plan view of the machine showing the curtain and operating mechanism. Fig. 3, is a sectional view on the line 3ˣ—3ˣ of Fig. 2 showing the curtain support. Fig. 4, is a front elevation of the front plate or key board of the machine. Fig. 5, is a perspective view of the mechanism for operating the register frame removed from the casing. Fig. 5ª, is a vertical sectional view on the middle vertical line of Fig. 1 showing the rear doors of the casing closed. Fig. 6, is a detailed view of the means for securing the register casing or channel in position. Fig. 7, is a perspective view of the ballot indicator or key and its register actuator. Fig. 8, is a horizontal sectional view of a portion of the machine showing a portion of a row of ballot indicators or keys with their registers and register actuators. Fig. 9, is an enlarged rear elevation of the lower left hand corner of the machine as illustrated in Fig. 1. Fig. 10, is a detailed perspective view of some of the parts shown in Fig. 9. Fig. 10ª, is a similar view showing the connection between the bars 28 and 143. Fig. 11, is an enlarged rear elevation of the lower right hand corner of the machine as illustrated in Fig. 1. Fig. 12, is a perspective view of one of the interlocking blocks. Fig. 13, is a similar view of a pin block or abutment. Fig. 13ª, is a view of a compensating plate in connection with the abutment employed in large multicandidate groups. Figs. 14 and 15, are perspective views of the wedges on the interlocking straps or rods. Fig. 16, is a side elevation of the upper end of one of the interlocking straps or rods. Fig. 17, is a similar view of one of the straps or rods connecting the main resetting bar with the resetting bar of the questions keys or indicators. Fig. 18, is an enlarged perspective view of the upper right hand corner of the machine viewed from the rear, with irregular voting mechanism removed. Fig. 19, is a perspective view of the parts at the lower right hand corner of the machine as shown in Fig. 1 illustrating the resetting bar and its operating mechanism. Fig. 20, is a plan view of the inner end of the curtain operating lever showing the locking device therefor. Fig. 21, is a vertical sectional view taken on the line 21ˣ—21ˣ of Fig. 2 showing the mechanism for setting or adjusting the machine for voters having a limited franchise. Fig. 21ª, is a detailed perspective view of a portion of the mechanism shown in Fig. 21. Fig. 22, is a vertical sectional view taken on the line 22ˣ—22ˣ of Fig. 2 showing the operating mechanism for the paper roll. Fig. 23, is a perspective view looking from the rear showing the irregular ballot slides and the paper roll in section. Fig. 24, is a vertical sectional view on the line 24ˣ—24ˣ of Fig. 1ª. Fig. 25, is a detailed perspective view of the mechanism for locking the irregular ballot slides. Fig. 26, is a vertical sectional view of the same. Fig. 27, is an enlarged end elevation of the paper roll frame and the securing device therefor showing the paper winding roll in section. Fig. 28, is a rear elevation of the end of the paper roll showing the securing devices therefor. Fig. 29, is a perspective view of the mechanism for causing the operation of the paper roll of the irregular ballot mechanism. Fig. 29ª, is a rear elevation of the left hand end of the paper roll and its holding device. Fig.

Figure 34:
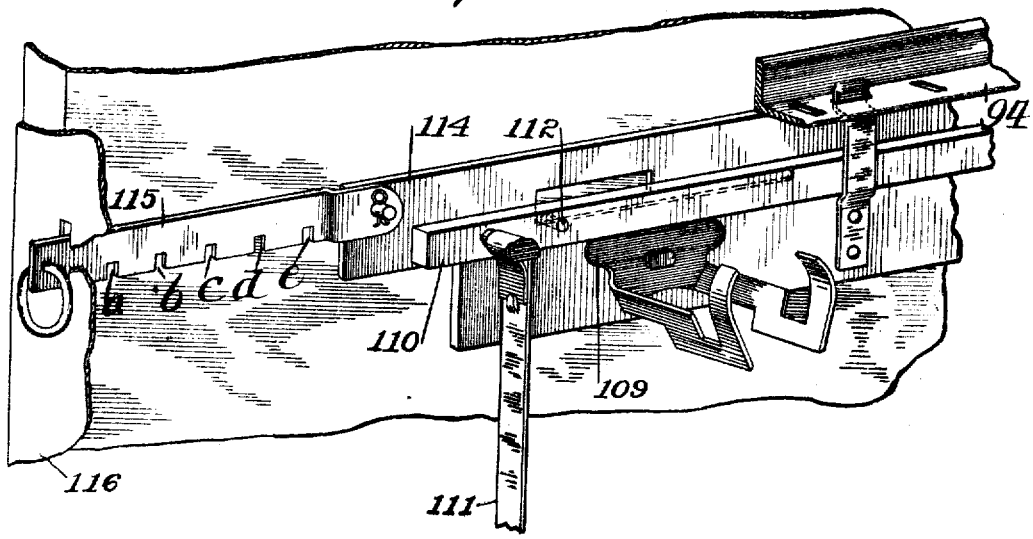
Figure 35:
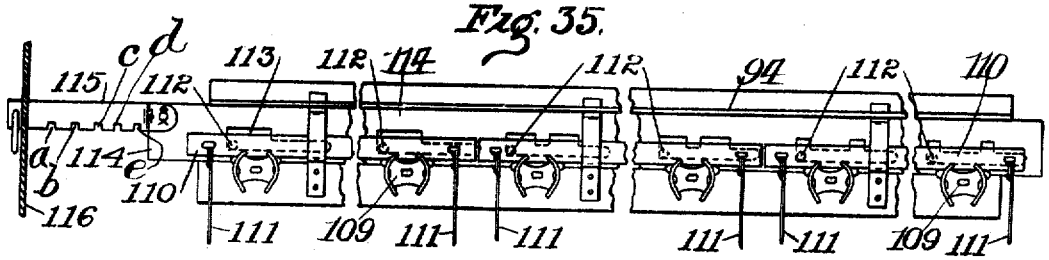
Figure 38:
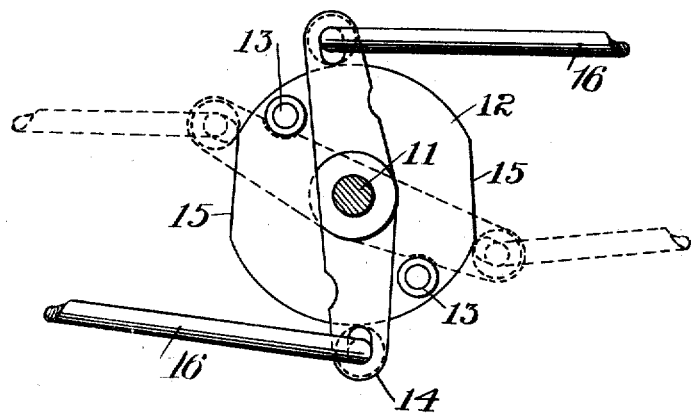
Figure 39:
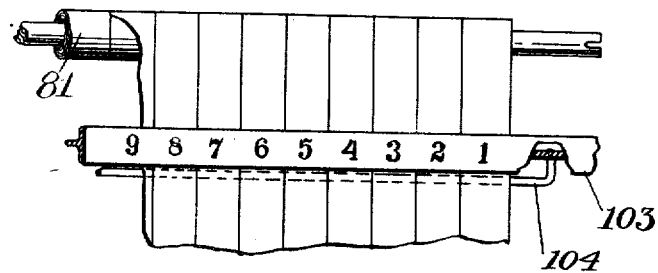
Figure 40:
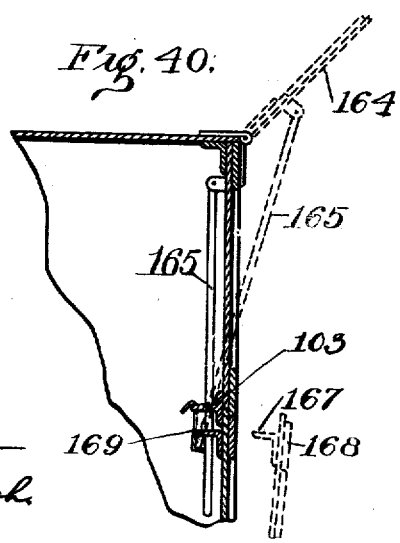
Figure 46:
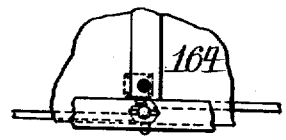

30, is a vertical sectional view taken on the line 30ˣ—30ˣ of Fig. 4, showing the mechanism for voting a split electoral ticket. Figs. 31 and 32, are perspective and sectional views looking from the front and rear respectively, showing the parts illustrated in Fig. 30. Fig. 33, is a view of one of the casings for containing the written or printed electoral ticket to be used in connection with the devices shown in Figs. 30 to 32 inclusive. Fig. 34, is a perspective view showing the details of the locking mechanism for the questions indicators. Fig. 35, is a rear elevation of a plurality of questions keys or indicators and the locking mechanism therefor. Fig. 36 is a rear elevation and Fig. 37, a perspective view of a modification of the mechanism shown in Figs. 34 and 35 for use when the questions keys are vertically arranged. Fig. 38, is a horizontal sectional view taken through the shaft of the curtain lever just below the top plate showing the mechanism for operating the register frame and resetting mechanism. Fig. 39, is a perspective view looking from the rear showing the paper guide used when transcribing the irregular ballots. Fig. 40, is a vertical sectional view taken on the line 40ˣ—40ˣ of Fig. 47 showing the device for supporting one of the rear doors in elevated position. Figs. 41 and 42, are perspective views of the interlocking rods or straps showing friction devices applied thereto. Fig. 43, is a front elevation, and Fig. 44, a vertical sectional view of an attachment for coöperating with the keys or indicators in the lowermost row. Fig. 45, is a perspective view of a portion of the register frame showing means for connecting the register actuators of indorsed candidates. Fig. 46, is a detailed view looking from the rear of the machine showing the locking device for the upper door. Fig. 47, is a vertical sectional view on the line 47ˣ—47ˣ of Fig. 5ª looking toward the rear and showing the locking mechanism for the door. Fig. 48, is a detailed perspective view of the central portion of the resetting bar and the connection with the truss member. Fig. 49 is a rear elevation of the mechanism for locking and releasing the resetting bar from the straight ticket mechanism. Figs. 50 and 51 are rear elevations of the straight ticket bars in two different positions showing the manner of coöperation with the interlocking rods or straps successively. Fig. 52, is a rear elevation of a modification of the means for operating the resetting bar. Fig. 53 is a sectional view on the line 53ˣ—53ˣ of Fig. 52. Fig. 54, is an elevation of the resetting device for the limited franchise lockout device. Figs. 55 to 57, are sectional views on the line 55ˣ—55ˣ of Fig. 54 showing the parts in different positions. Fig. 58, is a rear elevation of one end of the machine with the rear doors removed showing a modification of the locking mechanism and of the limited franchise lockout device. Fig. 59, a perspective view of parts shown in Fig. 58 and particularly the latch connections between the resetting device, the limited franchise lockout and the curtain locking device. Fig. 60, a perspective view of a detail. Fig. 61, a perspective view of a modification of the locking mechanism for the resetting bar at the end opposite to that shown in Fig. 58. Fig. 62 a sectional detail of the means for operating the lockout mechanism shown in Fig. 58. Fig. 63 a detail perspective of an alarm mechanism. Fig. 64, is a rear elevation of one end of the resetting bar locking device shown in Fig. 62.

My present machine embodies a casing suitably supported upon legs and having at the front a key board or plate 2 upon which the ballot indicators or keys and the other parts accessible to the voter are mounted, the operating and registering mechanism being arranged within the casing and covered during use of the machine by suitably hinged doors, three being shown in the present instance, the upper door 164 being hinged to the upper rear edge of the casing and swinging upwardly, the middle door 168 being hinged to the cross bar or rail 203 and the lower door 190 being hinged to the lower edge of the casing and swinging downwardly also. The front of the machine is, as usual, covered during the voting operations by curtains or closures carried by a rail or support 3 arranged at some distance from the casing, having the rearwardly extending ends fitting and removably secured in sockets arranged at the top thereof. The curtain is made in two parts 9 and 10 which are supported on rings encircling the rail, the ends indicated by 4 which are carried by the corner and sides of the rail remaining stationary while the meeting edges of the parts 9 and 10 are brought together and separated to cover and expose the front of the machine and permitting the entrance and exit of the voter, the movement of the front portion of the curtain being sufficient to expose the front plate or key board for all necessary purposes. The inner proximate ends of the curtain sections 9 and 10 are connected at 9ª and 10ª respectively with opposite sides of an endless cord or cable 8 passing around pulleys 8ª on the rail so that as the cord or cable 8 is moved in opposite directions the curtains will be brought together to cover the machine and separated to expose it.

7 indicates a flexible cord or cable connected to the cord 8 and to one end of an operating lever 5, having a depending handle 6 arranged in front of the machine and secured to a shaft or stud 11 journaled in the top of the casing, this shaft being connected to and controlling the register actuating and resetting devices of the machine, as will be described.

In machines of this character the ballot keys or indicators are first set or moved to voted position by the voter while he is in front of the machine and both he and the front plate are inclosed by the curtains, and the return of the indicators or keys to normal position and the registration of the indicated ballots is accomplished prior to the exposure of the front plate of the machine and of the indicators thereon. As the movement of the operating lever 5 from the position shown in full to that shown in dotted lines in Fig. 2 is necessary to unlock the operating parts of the machine and close the curtain and the movement from the position shown in dotted lines to that in full lines, is necessary to reset the indicators and open the curtains it will be seen from the connection shown that the curtain remains idle during the first part of the movement of the curtain lever or until it has moved a distance nearly equal to twice the length of the connecting cord 7, these parts being so adjusted, that, in the closing of the curtain the parts remain locked until the key board is covered and in opening the curtain the indicators are reset and registers are actuated before the front plate is exposed.

As in my prior patent referred to, the devices capable of operation by the voter for indicating his choice are arranged upon the front plate 2 of the machine which is shown in Fig. 4 in which 87 indicates the slides or doors controlling access to the paper on which the names of the persons not nominated may be written; 30 indicates the indicators or keys for questions for and against any proposition as, for instance, an appropriation; 31 indicates keys or indicators for the regularly nominated candidates for an office and 38 indicates the straight ticket keys or indicators by means of which votes for all the candidates nominated by a particular party may be indicated.

In the present embodiment the indicators or keys 31 for all the candidates of a particular party are arranged in the same horizontal row, at the end of which is the straight ticket indicator 38 coöperating with all of the indicators in that row, the indicators 31 for candidates for the same office being arranged in the same vertical column, as are also the slides 87 controlling the interlocking mechanism for indicators or keys for candidates for the same office, as will be described.

As in my prior patents the keys or indicators are movable into and out of voted position without causing the actuation of their corresponding registers and said registers are contained in a frame adapted to be moved toward and from the front plate, to cause the actuation of the registers whose indicators or keys are left in voted position. The movement of the register frame toward and from the front plate and the resetting of the machine for subsequent voters is caused by the movement of the curtain lever by the following means. The shaft 11 to which the curtain lever 5 is attached extends downwardly through the top of the casing and at its lower ends has a bearing in a stationary cam or guide plate 12 separated from the top of the casing by studs 13. Immediately above this plate and keyed to the shaft 11 is a double crank or lever 14 having at its outer ends small slots or apertures in which are the pin or bent ends of connecting rods or links 16, said links being pivoted at their outer ends to the bell crank levers 17 pivoted at 18 on the diagonal braces at the upper corners of the casing. As shown in Figs. 5, 18 and 38, the studs 13 contact with and limit the motion of the double crank 14 and the ends of the links 16 extend through the apertures in the crank and are arranged to coöperate with the edge of the plate 12. This plate 12 is curved on two sides substantially concentric with the shaft 11 so as to cause the ends of the links to remain at the extreme ends of the cranks during a portion of the oscillation of the shaft, and is cut away at 15 at the sides so that as the ends of the double crank 14 advance around the round portion of the cam plate the links 16 will be driven away from each other, but when the cut away portion of the plate is reached the outward movement of the links is arrested, and the last portion of the movement of the crank 14 until arrested by the pins 13, does not move the links 16, but the ends of the latter are prevented from independent movement toward the shaft 11 by the edges of the plate 12.

Pivoted to the outer ends of the bell crank lever 17 are depending links 20 connected to levers 21 pivoted at their rear ends in the sides of the casing. The forward free ends of the levers 21 are pivotally connected to the vertically extending rods or bars 22, one at each side of the machine, which are pivoted to levers 23 similar to the levers 21. These four levers 21 and 23 are disposed near the corners of the movable register frame in which the registers or counters are mounted, said frame being supported at its lower end by links 76 pivoted in the casing so as to permit a movement of the register frame toward and from the front plate of the machine. In the vertical sides or plates 24 which, with the plates or bars 66 and 67 constitute the register frame, are arranged cam slots or guides 25 one for each of the levers 21 and 23, each of said levers carrying the pin or roller 26 passing into the respective cam slots. A movement of the curtain lever through the mechanism described, raises and lowers the levers 21 and 23 causing the pins or projections 26 to move through small arcs struck from their pivotal centers as they are moved up and down. The vertical movement of these pins compared with the arc through which they move, is so small as to be substantially in a vertical line, while the cam tracks will cause the register frame to be moved forward and back, being driven from each of its four corners so that it is moved uniformly throughout its whole length. The bars or rods 22 extend to the top and bottom of the machine and at the top are connected to a bar 27 for the purpose of resetting the slides for the irregular ballots, as will be explained. At the bottom of the machine these bars 22 are arranged to contact with the resetting bar 28 which operates to reset and return to first position all of the interlocking straps or rods and the regular candidate and question indicators of the machine. This resetting bar constitutes a controlling member inasmuch as it constitutes a means for controlling the movement of the indicators in addition to its function as a resetting means.

From the above described construction it will be seen that while the ends of the links 16 are engaged with the cut away portion 15 of the cam plate, the bars 22 remain substantially stationary, holding the resetting bar locked in its lowermost position and locking all the voting devices as will be hereinafter explained and holding the register frame locked against movement, this being the position occupied by the parts when the curtain is removed from the front plate, so that there is no possibility of operating any of the voting devices while the front plate is exposed.

Vote indicating devices for regularly nominated candidates are substantially such as shown in my prior patents and in Figs. 7 and 8 embodying the indicator or key 31 pivoted in the front plate 2 and having at the rear side of the latter, the plate 621 having the curved slot 62 and the shoulder or abutment 622 adapted to coöperate with the hooked end 63 of the register actuator or pallet bar 64, said plate 621 being further provided with an ear or projection 623 with which the straight ticket bar coöperates.

The registers with which the ballot indicators coöperate, are arranged in the vertically extending casings or channel plates 65 which in the present instance contain a number of registers equal to the number of party rows for which the machine is adapted, and one register for questions to be voted on, the latter being preferably located at the upper end of the casing. These casings or channel plates are mounted in the register frame, the lower and upper rails or plates 66 and 67 of the latter being slotted for the reception of the sides of the casings by which they are held against lateral movement therein; a lip 68 is left upturned at the top and bottom of the register casing as shown in Fig. 6 adapted to be engaged with slots in plates 69 secured to the plates or bars 66 and 67, by means of screws 70, this construction preventing the register frames from forward or back movement in the frame, and holding the registers rigidly to their work as the machine is operated. The rear ends of the register actuators or pallet bars 64 are perforated at 641 for the reception of the adjustable staples or connectors 246 extending through the rock shafts or bars 182, 183 having crank journals 180 at their ends pivoted in the apertures 71 in plate 69. These coupling bars for indorsed candidates are each illustrated in Fig. 45 and will be described hereinafter.

In order to prevent the sagging of the register frame on account of its length and weight and the weight of the contained registers, the lower bar of said frame is braced by means of a truss rod 74 connected at its ends to the bottom rail of the register frame, suitable compression braces or studs 75 being provided between them as shown in Fig. 5.

In the operation of the machine, the arms 31 of the ballot indicators normally lie above the names of the candidates to which they are devoted, as shown in Fig. 4, and when said arms are brought down over the candidates' names, the shoulder 622 is turned up in rear of the projection 63 on the register actuator so that as the registers move toward the front plate, the register wheels will be moved and when the frame moves toward the rear again, the actuator being restrained by the hook 62 will complete the movement and register one number on the register. The registers may be of any suitable construction but are preferably as shown in my said patent.

The interlocking rods or straps 34 attached to each of the regular candidate indicators and also to the irregular slides, extend to the lower portion of the machine and are provided with interlocking wedges 341 and 342 which are arranged on adjacent rods to break joints, as shown in Figs. 14 and 15, the interlocking blocks or wedges 371 shown in Fig. 12 being arranged between adjacent rods or straps, and the interlocking rods are as usual divided into office groups by the removable locking pins 36 passing through apertures in the blocks 37. Each of these groups embodies the rods or straps for the indicators devoted to candidates for the same office and one irregular slide, as in my prior patent.

When it is desired to vote a straight ticket or indicate a ballot for each of the candidates nominated by a particular party, the straight ticket ballot indicator at the end of each horizontal row is moved, actuating the indicators in that row and drawing the wedges on the interlocking rods between the abutments in the channel 35. Where a large number of candidate indicators are employed considerable force is sometimes required to operate all the indicators at once and in the present arrangement I provide means for operating them successively and also obviate bending in the bearings which might be possible with a long straight ticket bar, by dividing said bar into two sections 40 and 400 pivoted together at 43 and shown in Figs. 1 and 50. The section 400 is pivoted to the lower ends of links 41 and 42, the upper ends of which are pivoted to the front plate, and the end of the section 40 is pivoted to the crank 39 connected to the straight ticket indicator or key 38. The links 41 and 42 are of the same length and are longer than the crank 39, the latter, however, in normal position being substantially vertical while the links 41 and 42 are inclined as shown in Fig. 51. From this construction it results that when the straight ticket indicator is operated the sections of the bar are drawn longitudinally by the crank 39, but the rear portion or section 400 rises first, carrying with it the interlocking rods or straps with which it is connected and, after the crank 39 has passed the vertical center, it begins to rise carrying with it the end of the section 40 and by the time it has completed the movement, all of the interlocking rods affected by the straight ticket bar are raised a uniform distance. By reason of the construction shown, some of the candidate indicators are operated successively instead of simultaneously which is desirable for the reason that the greatest resistance to the movement of the single candidate indicators is encountered at the instant when the interlocking wedges enter the interlocking channel and by delaying the movement of some of the indicators or keys the straight ticket device is operated more easily. Instead of making the straight ticket bar in two sections it could be made in one length and other means provided for preventing binding in its bearings in the supporting links.

It is desirable to prevent the operation of any of the individual candidate indicators until one of the straight ticket indicators has been operated, a means for this purpose being shown in one of my prior patents but in this present machine the interlocking rods or straps are provided with slots 44 through which passes the single resetting bar 28 shown in Figs. 1 and 11 adapted to be moved to restrict or reset the indicators when moved downwardly by the links or bars 22. This resetting bar is supported upon springs 281 secured to the casing and to the bar near its ends, and is provided at one end with a notch or recess 45, the lower side of which forms a projection adapted to coöperate with a stationary pin or roller 47, so that when said bar is moved to the left, Fig. 1, it will be locked from vertical movement. The other end of the resetting bar is provided with an inclined or cam surface 46 arranged to coöperate with the stud or collar 48 on the casing, said incline being so arranged relative to pins 48 and 47 that when the bar is moved down it will be given a longitudinal movement in the direction of the stud 47 sufficient to secure it at that end.

For the purpose of locking the resetting bar 28 until a straight ticket indicator has been operated and to lock the machine, I provide the universal and locking bar 49, having near its lower end a pin 50 for the purpose of engaging with the resetting bar 28. This bar is permitted a limited lateral movement within the bridges 51 and 52 and its downwardly movement is arrested by the spring 53. About midway of its length the locking bar is provided with the recess at 54 the edge of which may engage a stop or pin 55 carried on the front plate of the machine (see Fig. 49). When the bars 22 have been raised, the bar 49 is in position with the pin 50 bearing on the upper edge of the resetting bar, while the edge of the recess 54 engages the pin 55, preventing this bar 49 from rising, thus locking the bar 28 down at its head end, and the stud 47 in turn holds it securely at its rear end as before described. The bar 49 is held to this position by the spring 56 pivoted to the upper bridge at one end and bearing against and encircling the bar about midway of the length of the latter. The locking bar is also provided with recesses 57, one for each straight ticket bar, with which engage pins 58 carried on said straight ticket bars and when any one of the straight ticket bars is moved to the right (Fig. 1), its pin 58 immediately engages in the corresponding recess 57 in the bar 49, moving the latter laterally at that point. If the pin 58 is on one of the straight ticket bars above the point at which the spring 56 engages the locking bar, it will move the latter out at the top and the bottom will remain comparatively stationary, or rather it will rock around the left hand side of the bridge 52 as a center and this movement will carry the recess 54 away from the pin 55 releasing the bar 49 for upward movement, which will thus permit the resetting bar to rise. Thus, it will be seen that whichever straight ticket indicator is moved first, the resetting bar will be unlocked, permitting the further movement of the indicator and the voting of all the candidate indicators which are operated by it.

In order that the bar 49 may not be compelled to rise the full distance that the resetting bar does when it is released from the stop or pin 55 and to cause the release of the resetting bar from the pin 50, I provide a stationary stop or pin 500 with which coöperates a cam edge 501 on the bar 49 so that the latter is given a substantially parallel movement at the ends and any upward movement will cause the pin 50 to move into the slot 157. This arrangement however is desirable though not essential as the bar 49 may if necessary rise with the resetting bar.

A spring 53 is pivoted to the top of the bar 49 to start it down and thus start the straight ticket indicators back, when the voter lets go of it, after which gravity will carry it the rest of the way, but this spring 53 may be dispensed with if desired and the weight relied upon. The downward movement of the bar 49 is limited by a suitable stop such for instance as the pin 530 to which the spring 53 is connected and which engages the top of the bridge 51.

In order to further lock the resetting bar and prevent the operation of the straight ticket indicators until the curtain lever has reached the limit of its movement to cover the front plate, I provide a bell crank lever 158 pivoted on the plate 2, having one arm arranged to engage the bar 28 at the edge of the recess 157 when in normal position and arrange upon the rod 22 a pin 60 adapted to engage the other arm 159 of said lever 158 when the rod 22 has nearly completed its upward movement, so that the resetting bar then will be locked by the bar 49 alone. When the rod 22 is raised and the front plate is covered, the bell crank lever is held in the position shown in dotted lines in Fig. 49.

The irregular voting devices of the machine for permitting voting for persons not nominated are shown in Figs. 22 to 33 inclusive, and employ a paper roll, access to which is controlled by slides or doors, as shown in one of my prior patents. In the present arrangement I use the roll 77 of paper, mounted on a wooden shaft 78, as is shown in Figs. 1ª, 12 and 22, the paper web 79 passing over a platen 80 and adapted to be wound up on a shaft 81, which is driven by a mechanism which I will now describe.

The shaft 81 is detachably connected at one end to a ratchet wheel 82 journaled in bearings in the casing and in a bridge 83 which also incloses a bar having a ratchet rack 84 at its upper end and a hook 85 on the lower end and above the latter, a pin 86 resting upon one of the links 21. The doors or slides 87 permitting access to the paper to enable the voter to write upon this paper the names of persons not nominated, are shown in Fig. 23, each being formed of a metal plate with an opening 88 in the lower part thereof and on the bottom is formed an upturned part or lug 89.

The upper ends of each of the interlocking rods or straps 90 of the irregular slides or doors are formed with a recess 91 therein, the upper shoulder forming a projection which engages with the upturned part or lug 89 on its slide. Carried on the back of the face plate of the machine is a series of pins 92, which, together with pins 93 serve as guides for the irregular doors or slides 97. The upper ends of the interlocking straps 90 when in normal position extend to and somewhat beyond the pins 92 and are guided in their vertical movements by the pins 92 and slots in the plate 94 through which they pass. The doors or slides 87 are guided to move in a path at an angle to the line of movement of the interlocking straps, as is shown in Fig. 23, so that the upward movement of the door or slide will cause the interlocking strap to move vertically with it, until the lug 89 by a relative lateral movement, passes out of contact and disengages itself therefrom, leaving the slide free to move farther without it to uncover the paper web for writing or pasting the irregular ballot thereon. The disengagement of the slide or strap does not occur, however, until the interlocking rod or strap has moved far enough to prevent the operation of the regular candidate indicators with which it is grouped.

95 indicates a pivoted or rocking plate or wing extending horizontally across the ends of all the straps of the irregular slides, so that it is rocked to dotted line position shown in Fig. 22 by the upward movement of any one of them, and further movement of the interlocking rod or strap carries the end beyond the edge of the plate 95 thus preventing the latter from rocking back to normal position, and holding it locked in the position shown in dotted lines Fig. 22. The right hand end of the wing or plate 95 carries the arm 96, which engages with the bar carrying the hook 85, and as it rocks to dotted line position, shown in Fig. 22, the hook 85 is thrown forward until it passes under a pin on that side of the machine, which in this case is the end of the link 20 passed through the link lever 21 and beyond it, giving sufficient bearing for the hook 85 to engage therewith. The downward movement of the links or parts 20 and 21 pulls the hook 85 down the teeth thereon engaging with and causing the rotation of the ratchet wheel 82 and the shaft 81 keyed thereto, thus drawing forward the paper web 79, a distance substantially equal to the length of the apertures covered by the slides and causing the presentation of a fresh surface of paper to the apertures closed by slides 87 on the front of the machine. This arrangement in which the hook ratchet 84—8's normally stationary requires the movement of but few parts when the irregular covers or slides are not operated and enables the hook ratchet which I term an operating device to be connected with the reciprocatory member in the form of the cover 21 that is moved each time the machine is operated.

The shaft 81 is slotted at the end next to the ratchet wheel, into which extends a lug on the latter thereby making a detachable driving connection and the other end of said shaft has centered therein a pin which engages an aperture in a flat spring 181, seamed to the casing so that by pressing the spring against the casing the shaft may be detached at both ends and removed when desired.

The shaft 78 carrying the paper roll 77 is slotted at each end and is mounted on the angle arms 97 pivotally connected to the platen 80, as shown in Fig. 27, the downwardly extending ends of which prevent the lateral movement of the shaft, but by turning these arms to the dotted line position shown in Fig. 28, the shaft 78 may be removed from the machine. The roll of paper carried on said shaft is wrapped on a tube of cardboard of any similar material, which tube should be slightly larger in diameter than wooden shaft 78, so that it will be free to turn thereon without binding. The end of the paper may be secured to the shaft 81 in any suitable manner as for instance by forming a slot in the latter for a portion of its length and the end of the paper web may be cut off at the sides to present a point or narrow middle portion, which can be inserted through the slot, fastening it to the shaft so that it may be drawn forward thereby, when the shaft is turned as above described.

The ends of the interlocking straps 90 of the irregular balloting devices are slightly sprung, so that they have a frictional bearing on the plate 94 and the pins 92, which prevent them from dropping by gravity when they have been moved to voted positions.

The resetting bars 27 and 28 being connected to the bars 22, the downward movement of the latter will cause the bar 27 to engage the upper ends of the slides which have been operated and return them to normal position while the main resetting bar 28 will draw down the interlocking straps of said slides and restore them.

In Figs. 25 and 26 I have shown means for keeping the irregular slides locked during the movements of the curtain lever and for this purpose I provide the bar 98 pivotally mounted on supports 99 and employ a spring 100, so connecting the bar with one of its supports that it will be held normally against the front plate of the machine, over the irregular balloting slides 87 as in Fig. 26 and prevents them from being raised. The bar 22 carries thereon a pin 101, which engages with the upturned end 102 of the bar 98 and rocks it to vertical position as shown in full lines Fig. 26 holding it completely disengaged from the irregular slides leaving the latter free to be raised. This engagement between the pin 101 and the upturned end 102 does not occur until the curtain lever has almost reached the end of its throw, when a very little further movement is sufficient to move the bar 98 sufficiently far to disengage it. The backward movement of the curtain lever releases the bar 98 at the beginning of its movement, allowing it to tilt forward again locking all the irregular slides against movement. When the slide or resetting bar 27 operates to push back the irregular doors or slides that have been operated, the lugs 87 on the operated slides as they pass the bar 98 press it out until they have passed it, when it closes in behind them, locking them all against upward movement until it is again withdrawn by the forward movement of the curtain lever.

At the beginning of the election it is the duty of the judges or inspectors of election to mark the web of paper as it shows on roll 82, with their signatures or some other characteristic mark and at the end of the election these marks will remain in view unless the irregular balloting device has been operated. If they have advanced, it is evident that the irregular balloting device has been operated, and the judges or inspectors of election will then wind several inches more of the paper on the roll 81, so that the paper between it and the platen at the end of the election will be wound thereon. The web of paper may then be cut, and the loose end of the part carried on the roll 81, may then be inserted between the cross bar 103 in the casing and the guide 104, as shown in Fig. 22.

The bar 103 is finished as a reading gage, as shown in Fig. 39 having numbers thereon corresponding to the lines of office rows and the irregular slides or doors and by pulling the paper down as shown in Fig. 39, the paper web will bring the rows of names which may have been written thereon in line with the numbers on the reading gage, indicating the offices they have been voted for. I preferably use paper which has been ruled between centers, the same distance as that between centers of the irregular balloting apertures through which the paper is exposed, thus furnishing an additional indication as to the offices for which the votes have been cast.

The laws of several States which permit the use of voting machines provide that the names of all the presidential electors of any party shall be placed in connection with a single key or voting device, so that one key and one counter serves for the electoral ticket of the whole part, and while it is very seldom that a voter wishes to split his electoral ticket, either by voting for one or more candidates nominated by another party, or by one or more candidates that have not been nominated by any party or both, but in case the voter does desire to split his ticket however, I provide a mechanism shown in Figs. 30 to 33 to enable this to be accomplished. In this machine instead of requiring the voter to write the separate names of the electors upon the paper web 79, I provide a means by which a single printed or written ballot may be cast for all the electors and therefore the device by which this ballot is deposited is interlocked with the straps or rods of the indicators for presidential electors, which, in the present arrangement, is the first group next the straight ticket indicators. At the upper left hand end of the front plate 2, looking from the front, is provided an aperture 206, and back of this is arranged a bridge 107, in which is guided a slide or cover plate 207 provided with an operating lug or extension 106 and at the lower end with a lug or lip 208 adapted to coöperate with the shoulder 209 of the interlocking rod or strap 90. The upper end of the interlocking rod or strap is adapted to coöperate with a pin 210 so that when the rod or strap is raised by the slide, it will be released from the latter by its relatively lateral movement caused by the pin. Reference numeral 108 indicates a slide secured to bar 27 and having an aperture therein closed at the back by the bridge 107. In using this device the voter prepares his ballot, containing the names of the electors for whom he wishes to vote, folds it up places it inside of a metal casing or holder 105, see Fig. 33, and then raises the slide 106 and inserts the holder in the opening. The slide 108 is reciprocated with every movement of the resetting bar 27, whether an irregular ballot is cast or not, but the slide 106 is moved only when it is raised by the voter and then it operates the interlocking strap 90 similar to the operation of any of the irregular balloting devices as described. The holder 105 105 with the irregular ballot contained therein can then be inserted in the opening whereupon the slide 106 will drop, thus concealing it. When the machine is reset, the slide 108 travels down, and as it passes below the bridge 107, the holder 105 drops out backward, due to the downward and backward inclination of the bottom of the slide. The holder 105 drops into any suitable receptacle inside of the machine such for instance as a cloth pocket or bag 205 suspended immediately under the point at which the holders 105 are normally discharged, as shown in Fig. 30.

In Figs. 34 and 35, I have shown the keys or indicators by which votes may be indicated for and against questions coöperating with register actuators on the register frame such as shown generally in my prior Patent No. 647,657, also an improved form of lockout for such keys. These questions indicators or keys are provided at the back with a plate 109, which has a long flat top against which presses the questions indicator resetting bar 110 from which straps 111 extend to the main resetting bar 28 of the machine. Ordinarily, I provide a row of questions indicators of a length equal to the party rows, as indicated in Fig. 4, there being one questions indicator for each two single candidate indicators, so that in a thirty key machine there will be fourteen or fifteen questions indicators each having two registers with the actuators of either of which it can operate, but not upon both at the same time, as described in my said patent.

In applying my improved questions lockout to this machine, I divide the resetting bar 110 into three or more sections, as is shown in Fig. 35, and attach a strap 111 to each end of each section. This resetting bar may be divided into any number of sections, but I describe it as divided in three sections here each section coöperating with five indicators forming a group, as a matter of convenience, with the understanding that the principle of the lockout hereinafter described is capable of a still greater range of division.

Each of the resetting bars may embrace any number of the questions indicators, but we will say that the latter are divided approximately equally between them. Upon each of the resetting bars as shown are provided pins 112, as are shown in Figs. 34 and 35, which project backwardly from the bars into recesses 113, provided in the locking bar 114. If the pins 112 are free to rise in the recesses 113, then either of the questions indicators controlled thereby can be turned or moved to voted position, but if either or both of the pins 112 cannot rise, the resetting bar 110 to which they are riveted, cannot rise, and for this reason, the indicators cannot be turned or voted. In the construction shown two of these recesses 113 are provided for each of the resetting bars 110, and two pins 112 are placed on the resetting bar to correspond with the recesses. It will be seen that the first pair of the recesses shown in Fig. 35 are wide for the first half of their length and narrow, for the last half, and the bar 114 can consequently be moved to the left a considerable distance before the pins 112 will be engaged by the narrow portions of the recesses, when the bar 110 will be locked against rising and the indicators cannot be operated. Each recess of the first pair is formed with one wide and one narrow portion and each recess of the second set is formed with first a wide portion and then a narrow portion, then a second wide portion, then a second narrow portion, thus changing the effect of the recess on the resetting bar three times during the total movement of the locking bar 114 to the right, giving four different effects in all. The same is true of the third set of recesses, but it will be observed that where the wide spaces are long in the second part, they are short in the third part.

The gage 115 at the left end of the bar 114 is provided with five notches a, b, c, d and e, The engaging of the notch a with the plate 116 of the casing will leave the first set of questions indicators unlocked, will lock the second set and the third set. The engaging of the second notch b of the gage 115 with the plate 116 will lock the first and third sets of indicators and leave the second set unlocked, and the further movement will cause the locking of the indicators in various other combinations.

It will be seen that the questions indicators may be divided into any number of groups, and the locking bar may be provided with any number of different kinds of combinations described and any number of different classes of voters may be provided for, in these questions indicators, such as women voters, non-taxpayers, or township voters that might be included in a city precinct. By properly placing the questions on the machine in advance of the election, many more classes of voters may be provided for. In Fig. 36 I have shown these questions indicators arranged in a vertical column at the end of the keyboard, instead of a horizontal column parallel to the party rows. In this case I provide a slide 117 formed of two vertical bars connected at intervals by cross bars 118 one being arranged immediately above each one of the indicators. The lower ends of the members of the slide 117 are bent outwardly for engagement beneath the main resetting bar 28. The slide 117 is preferably made in two sections connected by the projections 120 or other equivalent connection to permit movement of the lower section independently of the upper one for a purpose to be described. A transversely moving lockout bar 121 is arranged in suitable guides at the top of section 119, and by movement to the left as shown in dotted lines in Fig. 36, it will lock the upper portion from rising, thereby locking all the questions indicators of the upper section, but the lower section is still free to rise and the indicators coöperating therewith may be operated. The parts 117 and 119 are counterbalanced by springs 122, relieving the questions keys as they are operated, of their weight.

In Figs. 10 and 11, I have shown means for preventing certain voters from voting for certain classes of candidates. As shown in Fig. 10, each of the interlocking rods or straps is provided with notches 123 with which are adapted to engage wings 124 one for each group mounted on a shaft 125 and capable of an adjustment rotarily thereon, said shaft 125 being rotatable in suitable bearings on the casing so as to bring the properly adjusted wings into locking engagement with the straps, leaving in inoperative position those which have been set back out of locking engagement with their rods, thus permitting the voting of some of the keys and locking others against movement. The wings 124 can be adjusted forward or back on the shaft in any combination desired and when so adjusted will be held in either position by friction, the bearing between the wing 124 and the shaft 125 being made large and tight for this purpose, and the wings can accordingly be accommodated to the requirements of any ticket that might be put on the machine. The shaft 125 carries at its right hand side (looking from the rear) a fork 126 keyed thereon which engages with the upturned end of a slide 127 guided for vertical movement on the casing and having a handle 128 connected thereto at the top of the machine. Raising this slide operates to rock the shaft moving the wings thereon into and out of locking position. Connected to the slide 127 is the longer arm of the bell crank lever 129, which is pivoted to the casing at 130, see Fig. 49. The shorter arm of the bell crank lever rests against the straight ticket locking bar 49, so that the upward movement of the bar 127 rocks the lever 129 and pushes the bar 49 away from the locking pin 55, thus making the further operation of the machine independent of the straight ticket indicators, which latter could not be operated by a voter having a limited franchise.

Inasmuch as it is desirable to be able to set the machine for a voter with a limited franchise when the front of the machine is exposed and to return the machine to position for voters with full franchise after each operation by a voter with limited franchise I provide a latch or loose connection between the operating devices and this lockout mechanism such as is shown in Figs. 18 and 21 and 54 to 57. In this arrangement, the operating handle 128 is separate from the bar 127 but is connected thereto by a leaf spring 721 the tendency of which is to move the lower end of the handle 128 toward the bell crank lever 17, and upon said handle is provided a pin 821 one end being adapted to engage beneath said lever when the latter is raised to its highest position elevating the rod or bar 22 and the other end passing loosely through the bar 127. When the front of the machine is exposed the horizontal arms of the lever 17 are in the position shown in Figs. 18 and 54 and the pin 821 on the bar is beneath it and when it is desired to throw in the limited franchise mechanism, the inspector moves the handle 128 forward at the upper end disengaging the pin 821 from beneath the lever 17 and raises it exposing the sign at its upper end which is normally covered by the shield 800, and the pin 821 then rests against the lever near its upper side as shown in Fig. 56 the spring however pressing it toward said lever. When the curtain is closed again the lever 17 moves up a sufficient distance to cause the pin to be pressed under it again by the spring, so that when the curtain is again opened the lever is moved down carrying the bar 127 and the machine is restored to position for a voter with full franchise. This latch connection between the operating mechanism of the machine and the lockout bar is advantageous as the latter may be set for a voter with limited franchise whatever the position of the curtain lever may be but the device will be freed at each operation of the handle or lever of the machine.

In Fig. 17 I have shown the strap which connects with the resetting bars of the questions lockout mechanism shown in Figs. 34 and 35. If the wings 124 connected to the bar 127 are in locking position, they will not interfere with the straps 111 being raised, for the reason that the straps 111 are cut out with a long recess 211 to permit the raising of the questions indicator resetting bar to which it is attached, whether the wings 124 are in locking or unlocking position.

For the purpose of enabling the inspector to control the operation of the machine to the extent of preventing more than one operation of the curtain I have shown in Figs. 1, 18 and 20, a curtain lever catch and an inspector's knob for releasing it. In Fig. 20, 150 refers to the usual ratchet or toothed wheel or segment of the device which compels a full stroke of the curtain lever and which is keyed to the shaft 11 of the curtain lever. A locking pin 151 which is controlled by the inspector projects through the top plate of the machine into the box wherein the full stroke device is contained, for the purpose of locking and unlocking the machine, and the position of the curtain lever before the voter incloses himself to operate the machine is shown in full lines;—the dotted line position being that assumed by the parts when the voter has concealed himself by the curtain. Before the voter can move the parts from the positions they occupy in Fig. 20, the inspector must raise the knob 152, shown in Figs. 1 and 18 which through the lever 155 pulls down the pin 151, and leaves the segment 150 of the full stroke device and the lever free to move. The full stroke pawl (not shown) keeps the curtain lever from reversing until it has reached the end of its movement, when the pin 151 engages in the hole 153, from which latter it is withdrawn by the operation of one of the straight ticket indicators or by the raising of the inspector's knob. See Figs. 18 and 20.

In Fig. 9 I have shown a device by which a portion of the keyboard may be freed from the influence of straight ticket indicators, so that while the rest of the machine may be operated by straight ticket voting, this part of the machine must be operated by voting the indicators one at a time. The straight ticket bars 40 have each at their left ends (looking from the rear) a pin 141 which in its forward and upward movement engages in a slot 142 in a bar 143, free to rise and fall, being practically guided by the stationary pin 144 and operating in the slot 145. At the lower end of the bar 143 is mounted the bar 146, which extends through slots in and engages with interlocking straps or rods in one or more adjacent single candidate groups. When a straight ticket indicator is moved to voted position the pin 141 thereon engages with the bar 143 and carries it up with it, and when the straight ticket bar returns, the bar 146 engaging with the interlocking straps with which it has been connected, will pull those indicators of the party row back to unvoted position, after which any of these indicators may if desired be separately moved to voted position, raising the bar 143, which will remain up until the indicators are reset by the resetting of the machine. The bar 143 is provided with a lug 341 at its lower end extending under and engaging the resetting bar 28, and by which it is positively reset when the keys or indicators are reset. The bar 146 is adjustable in the bar 143 so as to engage the interlocking rods or straps of any number of single candidate groups of indicators or keys, and is adapted for the conditions obtaining at present in the city of Indianapolis, Indiana, where there are regular party candidates in nomination, and where the law also requires that certain elected officers such as school trustees' shall be nominated by petition, and their names arranged alphabetically on the machine, independent of the parties, and they shall be voted for individually.

As shown in Fig. 18, the straight ticket bar 40 as it is moved upward and laterally by reason of its connection with the crank 39 engages the pin 154, carried on the bar 127, causing said bar to move up therewith, and said bar 127 has a slot 271 thereon into which projects the end of the lever 155, pivoted at 156, which lever connects the locking pin 151 with the inspector's knob 152. As the straight ticket bar moves the bar 127 up, it raises one end of the lever 155, pulling down the other end to which is attached the pin 151, thereby unlocking the curtain lever for backward movement, the slot and pin connection, however, permitting the lever to be raised independently of said bar when desired. I prefer to leave a little play between the parts 126 and 127 so that the shaft 125 carrying the wings 124 need not be moved when the straight ticket bar operates to unlock the curtain lever.

In Figs. 1, 2 and 3 I have shown the curtain rail 3 carried on top of the machine and in plates provided with upturned ends 257 and 258, the forward end 157 projecting out from the machine casing, and both being perforated and the curtain rail 3 extends through them resting directly on top of the machine casing. By pulling the curtain rail 3 forward until the end disengages from the rear ends 258 of the plates, it can drop down in front of the voting machine casing to the dotted line position shown in Fig. 3. The pin 259 is provided in the ends of the curtain rail to prevent it going back too far, when it is in the horizontal position, and also to prevent it from dropping through and down when it is in dotted line position. The rail mounted in this way is easily raised to position for elections, and is as easily taken down again after the election is over, when it is desired to store the machine.

As shown in Figs. 9, 10, 1 and 16, I have shown what I call a muffling bar 161 extending through apertures in the interlocking rods or straps to deaden the noise made by single candidate indicators or keys when they are moved to voted position in splitting a ticket and the front and back part of the indicators or keys being connected rigidly together, when the key is returned to normal position, the ends of the slots in the interlocking straps or rods will strike against the leather strip 160 on top of the muffling bar 161, as shown in Fig. 10 before the front part of the key strikes its neighbor on the keyboard. Without this arrangement, the contact of the keys might produce a click which would be heard when the keys are operated individually, but the leather strip on the muffing bar above referred to effectually prevents this.

On account of the extreme length of the resetting bar 28 in a machine of this class, it is apt to spring a little between the ends if keys are hard to return in the middle of the machine, by reason of the fact that the force is applied to the ends of the bar only, and to overcome this, I provide the truss 162 connected to the bar at each end and extending over the compression piece 163 at the middle which latter is movable longitudinally of the bar as shown in Fig. 48 so as not to interfere with grouping in the middle of the machine. This piece 163 serves as a means of operating the bar at a point intermediate its ends so that in effect the bar is operated at both its ends and middle. I prefer in some instances instead of using the truss rod and compression member for driving the resetting bar or if desired in addition thereto to employ the construction shown in Fig. 53 this arrangement being especially desirable in a machine employing a large number of candidate keys. In said figure the rod or bars 22 are connected at their lower ends to the outer ends of levers 222 pivoted at 223 said levers carrying between their ends links or compression members 224 slotted at their lower ends for the accommodation of the resetting bar 28 and adapted when the rods 22 are moved downwardly to reset the machine, to operate upon the bar 28 at points intermediate the ends first and then before the movement is completed the ends of the rods 22 engage the ends of the bar 28 and cause its uniform lateral movement through the short distance necessary to complete the resetting of the indicators effectually preventing the bar 28 from springing or yielding at any point.

In Figs. 14 and 15 are shown the interlocking wedges on the interlocking straps or rods which when the rods are in place are arranged to break joints with each other as is described in one of my pending applications, to permit the straps to come close together when out of the channel, and in Fig. 12 is shown a wedge or block 371 such as are between the rods or straps and which has a slot 372 in the edge engaging with the interlocking channel on one side in such manner as to prevent the block from dropping down flatwise in the channel. The pin block or abutment 37 that is secured by the pins in the channel is provided with slots in the sides similar to those in the wedges, said block being made in separate parts as shown, each cut away on the proximate side to form the central aperture 373 for the pin 374, said parts not however being secured rigidly together. When the interlocking straps or rods are grouped to permit the operation of several of the indicators in adjacent columns, the abutment or block is rendered free by the withdrawal of the locking pin and the sections remaining in contact, slide laterally in the channel as will be understood, but where a large number of interlocking rods are formed in a multicandidate group by the withdrawal of the pins it is desirable to compensate and provide for the aggregate amount of lost motion between the parts, otherwise more than the predetermined number of rods or straps might be operated, and to prevent this I employ compensating blocks or strips 375 having the projection at one side to hang on the channel plate 35, and which are adapted, in large groups, to be inserted between the halves of the blocks 37, as shown in Fig. 13ª, so that the extra space will be taken up and there will be provided a beveled lower edge on each side of the compensating strip or plate which insures the easy operation of the wedges on the adjacent interlocking rods when drawn in by the operation of the indicators or keys.

103 and 203, Figs. 40 and 47, indicate bars or rails preferably of angle iron extending across the rear of the casing, the upper door 164 and the middle door 168 closing against the former, and the door 168 being hinged upon the latter, against which also closes the upper edge of the lower door 190. The lower door 190 is provided at its free edge with a pivoted plate having a bolt 269 engaging the rail 203 and to which are pivotally connected the sliding bolts 270 engaging the sides of the casing. The bolt 269 is adapted to be secured by a key lock 271. The free edges of the doors 164 and 168 are secured by similar locking devices. In order that the upper door 164 may be held in elevated position when inspecting the paper roll and also to provide an interlocking mechanism between it and the middle door, I provide said upper door on the rear side with two bolts or rods 165 pivoted near the hinge and extending downwardly through apertures or recesses preferably in the present instance formed in the bar or rail 103. The upper end of the door 168 is also provided with perforated lugs or ears 167, which when said door is closed are beneath the apertures in the rail 103. When the upper door 164 is raised to a vertical position the middle door 168 may be closed bringing the lugs 167 beneath the rods 165, then, as the door 164 is closed the rods 165 pass down through them preventing the independent movement of the door 168. These locking rods 165 are also adapted to support the door 164 when moved up, to inspect the paper roll, and for this purpose I pivot to the rail 103 two stirrups or catches 169 which swing forward by gravity beneath the lower ends of the rods, as shown in dotted lines in Fig. 40, and hold them.

For the purpose of spacing and of affording slight frictional resistance to the movement of the interlocking rods or straps and preventing their accidental movement, I arrange between them a series of felt washers 325 mounted on a bolt 326 passing loosely through apertures in said straps as shown in Fig. 41 or if desired a single strip of felt 327 may be wound back and forth between the rods as shown in Fig. 42.

In a machine in which it is necessary to operate the straight ticket indicator to release the individual candidate indicators or keys, the voter after operating the straight ticket device, returning all the indicators operated, and then after voting one or two splits, may overlook the fact that he had not voted for all of the candidates nominated and in order to enable him to be reminded of the fact, I provide a means illustrated in Figs. 43 and 44 for preventing the loss of such votes. At the lower portion of the front plate or keyboard 2 is arranged a rail or track 169 preferably of angle iron, upon which is arranged to be moved a traveler 171 provided with an operating handle 173 and with three wheels embracing the track and provided with a fourth guide or steadying wheel 172 bearing against the front of the casing. Near the top of the traveler is pivoted a pawl or arm 174 the free end of which is operated downwardly by a spring 175, the lower end of said pawl being adapted to contact with the upper sides of the knobs or handles on the keys or indicators in the lowermost party row. The strength of the spring 175 is great enough to move down one of the indicators or keys, provided it is free to move and is not restrained by the interlocking mechanism. After arranging his ballot and before opening the curtain, the voter moves this traveler along the bottom row of indicators and if in any vertical column no indicator has been moved to voted position, the pawl or arm 174 will when it engages the lowermost indicator in said column move it down to voted position and thereby indicate to the voter that he has failed to vote for candidates for that office, after which he may return the indicator moved by the arm, and vote for such candidate in that column as he desires.

In order to provide for voting for candidates who have been indorsed by two or more parties I provide the mechanism shown in Fig. 45, for coupling the actuators of two or more registers devoted to the same candidate, whereby they are coupled for simultaneous operation by the indicator or key devoted to either. The register actuators are each provided with an aperture in the rear end with which are adapted to coöperate movable and adjustable connecting pins or staples 246 passing transversely through coupling bars 182, 183, provided with cranks 180 at their ends journaled in the apertures 71 in the plates 69 on the register frame, to swing in the arc of a circle. The bars may be mounted in the plates 69 by passing the upper pivot pins through the apertures 71 in the top plate, raising the bars until the lower pin can be passed into the aperture in the bottom plate and then lowering the bar, the upper pins on the bars being the longer to permit this. In order to prevent accidental movement the ends of the pivot pins may be split and spread offering friction in the bearings. The coupling pins 246 on any bar being moved into engagement with the actuators of registers devoted to the same candidate, will cause the simultaneous operation of the latter when the indicator for one of the actuators is moved to voted position and the register frame is moved toward and from the front plate or keyboard. By the employment of the coupling bars such as described I am enabled to connect the actuators of the registers of two or more different candidates for the same office, thus in Fig. 45 the bar 182 is shown coupled to the second and fourth register actuators and the bar 183 to the first and third.

In Figs. 58 to 62 I have shown a modified arrangement of the mechanism controlling and controlled by the limited franchise devices and also a modification of the means for securing the indicator locking bar and the bar controlled by the straight ticket bars. In this modified arrangement the member or bar 491 which corresponds to the bar 49 in the other drawings is caused to move in a vertical plane only, being guided in its movements by stationary pins 492. Upon this bar are arranged projections in the form of rollers 493 with which the beveled ends of the straight ticket bars 40 engage when moved longitudinally and laterally by the indicators 38 to raise the bar. Near the lower end of the bar 491 is a pin or projection 494 adapted to be engaged by the locking lever 495 pivoted at 496 to the casing, said lever having also a projection or roller 497 adapted to coöperate with the slot 157 in the locking bar 28 and with a shoulder or projection 498 thereon. In this construction I employ the levers 222 for operating the locking bar 28 shown more fully in Fig. 52, which are operated upon by the bars 22, and one of said levers is provided with a pin 499 on its rear side (dotted lines Fig. 58) which is adapted when the lever moves upwardly to engage the notched upper end of the locking lever 495 to release it from the bar 28. In this modification also the locking bar 28 instead of having a longitudinal movement is secured at one end by the lever 495 and at the other by a pin 500 mounted on pivoted links 501 and adapted when over the solid portion of the bar (Fig. 61) to lock it and when in line with the slot 502 to permit its movement. 503 indicates a rod or link connected to the pin 500 or links 501 extending across the machine and having a slot 504 therein in which operates a pin 505 on the lever 495, the end of the rod 503 being extended and adapted to be engaged by one arm of a bell crank lever 506 pivoted at 507 on the bar 491 and having its outer end connected to the rod 127ᵃ corresponding in some respects with the rod 127 shown in the other drawings and controlling the limited franchise locking device. 508 indicates a spring serving to move the lower end of the lever 495 outwardly. The upper end of the rod 127ᵃ is pivoted to a crank 509 on a stud 510 journaled in the front plate and having an indicator or pointer 511 coöperating with suitable indicia on the side of the casing and corresponding in function with the handle 128. The rod 127ᵃ is provided with a projection 127ᵇ coöperating with the finger 126 on the shaft 125 carrying the wings 124 for securing some of the candidate indicator interlocking rods and said finger 126 has also attached to it a finger or projection 126ᵃ coöperating with projections formed on the bar 491 at the ends of the slot 126ᵇ so that the movement of the rod 127ᵃ and shaft 125 will raise the bar 491 to release the indicators. Above the upper end of the bar 491 is a sliding plate 491ᵃ which is practically a continuation of it though separately movable in one direction provided with a pivoted latch 512 normally held against a pin or stop 513 by a spring 514 (Fig. 59) and arranged when the plate 491ᵃ is in uppermost position to be engaged and the plate pressed downwardly by a projection 515 secured to the rod 22, the location of the stop 513 being such relative to the path of movement of the rods 22 that the projection 515 will become disengaged before it completes its downward movement. The parts are shown in Fig. 58 in the position they occupy when the locking bar 28 is secured by the pin 500 and the projection 497 on the lever 495 and while the curtain is open and the rods 22 are in lowermost position. When the rods 22 are raised the pin 499 on the lever 222 turns the lever 495 just before it reaches normal position releasing the projection 497 from one end of the bar 28 and through the rod 503 releasing the pin 500 at the opposite end of the locking bar 28 which may be raised by its springs. When the limited franchise mechanism shown in these figures is to be employed the rod 127ᵃ is raised by its handle 511 turning the shaft 125 and securing some of the interlocking straps as before described, this operation through the bell crank 506 thrusts the rod 503 longitudinally disengaging the pin 500 from one of the locking bars 28 and turning the lever 495 moves the projection 497 into line with the slot 57 in the locking bar, disengages the lower end of said lever from the projection 494 and raises the bar 491 and plate 491ᵃ so that the predetermined candidate indicators and none others can be operated without the necessity of operating a straight ticket indicator. When the bar 491 is raised the plate 491ᵃ moves with it and the pawl or latch 512 is raised into the path of the projection 515 on the bar 22 and it is immaterial whether or not the bar 22 is in raised or lowered position as if raised the pawl will yield when said bar 22 is moved upwardly and will drop beneath it. This upward movement of the bar 491 and plate 491ª also causes the release of the curtain locking lever 155 whether or not the handle 152 is operated, inasmuch as the said plate is provided with a cam surface 516 (Figs. 58 and 59) which engages with the lower end of the lever 155 and moves it laterally disengaging the pin 151. The plate 491ª has sufficient friction in its bearings to cause it to remain in elevated position until positively moved downward again by the engagement of the projection 515 with the latch but the bar 491 after being elevated either by a straight ticket bar or by the rod 127ª returns to normal lower position and assists in returning or starting the return movement of the straight ticket bar if one has been moved to actuate it.

In order that the inspectors and public may be apprised of the operation of the actuation of limited franchise lockout device and also of the movement of a straight ticket indicator I provide an alarm in the form of a bell having a hammer 550 and a latch 551 pivoted on the projection 507 on the locking bar 491 said latch engaging with the hammer when the bar 491 is moved upwardly.

It is sometimes desirable to leave the resetting bar 28 free of the locking device that is controlled by the straight ticket device and the limited franchise lockout mechanism, in order that any of the indicators may be operated freely and for this purpose I provide the bar 28 with two apertures 428 into either one of which a pin such as a cotter 430 may be inserted, said apertures being so located relative to the links 501 that when placed in the aperture nearest the slot the pin 500 will be held in line with the slot and the bar may be freely moved at all times and when placed in the other aperture the bar will be locked by the parts described. The last mentioned aperture simply serves a means for holding the pin in convenient position for use when desired.

The operation of the machine as a whole will from the above be readily apparent to those skilled in the art and further detailed description is not deemed necessary.

I claim as my invention:

1. The combination in a voting machine, of ballot indicators one for each candidate arranged in party rows, and a movable member operating simultaneously upon a plurality of the indicators in a party row but moving them at uneven rates to complete voted position.

2. The combination in a voting machine, of ballot indicators one for each candidate and arranged in party rows, a straight ticket device for moving to voted position all the indicators in a party row, said device operating simultaneously upon a plurality of indicators but actuating the indicators at uneven rates to complete voted position when fully operated.

3. The combination in a voting machine, of ballot indicators and a straight ticket voting device comprising a longitudinally and laterally movable bar in two parts or sections, and means for causing a variation in the speeds of the lateral movements of the ends of one section during its longitudinal movement.

4. The combination in a voting machine, of ballot indicators and a straight ticket bar, and operating device therefor, and means for varying the lateral movement of portions of the bar relative to the indicators during the movement of the operating device.

5. The combination in a voting machine, of ballot indicators and a divided straight ticket bar, one part thereof being connected to parallel links of equal length, the other part pivoted to the first part at one end and connected at the other to a link of different length, whereby a uniform lateral movement is secured in one part and a progressive lateral movement in the second part when the bar is moved longitudinally.

6. The combination in a voting machine, of ballot indicators, and a straight ticket bar coöperating therewith having an equal lateral movement at both ends, and means for causing its lateral movement at the ends at different times during a complete movement in one direction.

7. The combination in a voting machine, of a series of movable ballot keys or indicators, a laterally movable straight ticket device for moving to voted position all indicators controlled by it, means for operating the device laterally more rapidly at one end than at the other, said device being movable laterally substantially an equal distance throughout its length.

8. The combination in a voting machine, of a series of ballot indicators one for each candidate arranged in party rows, a straight ticket indicator for each row for moving collectively all the keys in its row, means common to all the straight ticket indicators for returning any operated indicator to its normal position.

9. The combination in a voting machine, of a series of ballot indicators arranged in parallel rows, a straight ticket indicator for the collective operation of the indicators in each row, means to reset a predetermined number of indicators along with the straight ticket indicator without resetting the remaining indicators in the row.

10. The combination in a voting machine of a series of ballot indicators arranged in parallel rows, a single means by which the collective operation of all the indicators in a certain row can be effected, said means subsequently operating to reset a predetermined number of said indicators.

11. The combination in a voting machine of ballot indicators arranged in rows, means for causing the movement of some of the indicators in a row in one direction and the movement of other indicators in the same row in two opposite directions.

12. The combination in a voting machine, of ballot indicators arranged in rows, means for causing the movement of some of the indicators in a row in one direction and the movement of other indicators in the same row in two opposite directions leaving all the indicators free for subsequent movement.

13. The combination of a series of ballot indicators arranged in a plurality of parallel rows, a slotted rod or strap attached to each indicator for movement therewith, said straps being of different lengths for each party row, a bar engaging the slots in a predetermined number of straps of each party row, straight ticket mechanism for each party row, means connecting the straight ticket mechanism with the bar above mentioned to cause its movement in one direction with all the indicators and its movement in the opposite direction with the indicators with which it has engagement through the straps.

14. The combination of a series of straight ticket indicators with the straight ticket bars therefor, a pin carried on each bar, a bar extending transversely to said straight ticket bars having slots opposite said pins, when the straight ticket bars and the transverse bar are in their normal position, said transverse bar being engaged by the pin of any of the straight ticket bars and moved transversely thereby.

15. The combination in a voting machine, of a series of straight ticket indicators arranged in parallel rows, straight ticket bars therefor, a pin carried on each bar, a universal bar extending transversely to said straight ticket bars and having slots normally opposite said pins, each of said pins on the movement of its straight ticket bar engaging said universal bar causing it to reciprocate longitudinally, an adjustable bar carried on said universal bar engaging mediately with said indicators whereby said indicators are caused to reciprocate with the straight ticket bars.

16. The combination in a voting machine, of an oscillatory lever, a handle connected thereto, a divided curtain, an endless cord connected to the parts of said curtain, connections between the cord and the lever whereby the movement of said lever in one direction will open the curtain and the movement in the opposite direction will close it.

17. The combination in a voting machine, of an oscillatory lever, a handle connected thereto, a guide or rail, a divided curtain hanging therefrom, an endless cord connected on opposite sides to the halves of the curtain, and connections between the endless cord and the lever, whereby the movement of said lever in one direction will open said curtain and the movement in the opposite direction will close it.

18. The combination in a voting machine, of an oscillatory lever, a handle connected thereto, a guide or rail, a divided curtain hanging therefrom, an endless cord connected on opposite sides to the halves of the curtain, and connections between the endless cord and the lever, whereby the movement of said lever in one direction will open said curtain and the movement in the opposite direction will close it, and a loose connection between curtain and lever permitting independent movement of the lever to reset the machine before the movement of curtain begins.

19. The combination in a voting machine, of a reciprocatory frame carrying registers and register actuators, oscillatory levers arranged at the sides of said register frame, and cam connections between said levers and the sides of the frame whereby the oscillation of said levers will cause the reciprocation of said register frame and means for oscillating the levers.

20. The combination in a voting machine, of a support, a plurality of ballot indicators thereon, of a register frame and a corresponding plurality of registers thereon, two oscillatory levers arranged at each side of the frame, cam connections between said levers and the frame and means for simultaneously oscillating the levers to move the frame toward and from the support.

21. The combination in a voting machine, of a support, a plurality of ballot indicators thereon, a register frame, a corresponding plurality of registers thereon, and four levers connected for simultaneous operation and having cam connections at separated points with one of the parts for moving the support and register frame relatively toward and from each other and maintaining their parallelism.

22. The combination in a voting machine, of a reciprocatory register frame and registers and register actuators thereon, cams in the sides of the frame and oscillatory levers at the sides of the frame having projections operating in said cams whereby the movement of said levers in either direction will cause the reciprocation of said register frame and means for causing the simultaneous movement of said levers.

23. The combination of a plurality of ballot indicators arranged in a plurality of parallel rows, slotted interlocking straps or rods of different lengths connected to the indicators in different rows and interlocking devices coöperating with the straps or rods, a muffling bar extending through the slots in all the straps and having on its edges strips of leather or similar nonresonant material to deaden the sound made by the moving parts.

24. The combination of a plurality of ballot indicators, interlocking devices therefor having slots and a stationary muffled bar extending through said slots.

25. The combination of a plurality of indicators, straps connected thereto having slots therein and a stationary muffled bar extending through said slots.

26. The combination of a plurality of indicators, straps connected thereto having slots therein, a stationary bar extending through said slots with leather strips at the edges to engage the straps.

27. The combination in a voting machine, of a plurality of interlocking rods or straps having slots, a resetting bar extending through said slots, means for driving said resetting bar at its ends and intermediate its ends.

28. The combination in a voting machine, of a series of interlocking straps having slots therein, a resetting bar extending through said slots, means for driving said resetting bar at its ends and intermediate its ends, the driving device applied intermediate said ends having an independent movement longitudinally of the bar so as not to interfere with interlocking straps.

29. In a voting machine, the combination of a series of indicators arranged in groups, a bar for each group having projections thereon, a lockout bar having a plurality of projections and recesses thereon adapted to engage the projections on the different group bars when placed in different positions to lock different combinations of indicators.

30. The combination in a voting machine, of a plurality of indicators, a single lockout bar coöperating with the indicators to lock them from operation, and movable progressively to different positions, in each of which positions it releases some and locks other combinations of indicators.

31. In a voting machine, the combination with a plurality of indicators, a plurality of bars, each coöperating with a separate set of indicators and a single locking bar controlling said last mentioned bars and adapted to lock and release certain combinations of indicators depending upon its position.

32. The combination in a voting machine, of a plurality of questions indicators arranged in groups, a resetting bar for each group, a single adjustable locking bar to control said resetting bars in a variety of combinations and thereby lock said indicators.

33. The combination in a voting machine, of a plurality of indicators, a resetting bar moving laterally to reset and lock said indicators, a second bar movable longitudinally to lock said resetting bar, thereby locking said indicators against movement.

34. The combination in a voting machine, of a plurality of questions indicators arranged in groups, a resetting bar for each group, projections on said resetting bars, a locking bar having recesses arranged in pairs and adapted to coöperate with the projections on said resetting bars to lock the latter, each recess having broad and narrow parts, the recesses of each pair differing from the others in the arrangement of the broad and narrow parts.

35. The combination in a voting machine, of a plurality of questions indicators arranged in groups, a resetting bar for each group, projections on said resetting bar, a locking bar having recesses arranged in pairs and adapted to coöperate with the projections on said resetting bars to lock the latter.

36. The combination in a voting machine, of a plurality of indicators, a plurality of resetting bars therefor, projections on said resetting bars, a locking bar having recesses in which the projections operate composed of broad and narrow spaces.

37. The combination in a voting machine, of a plurality of indicators, resetting bars therefor, projections on said resetting bars, a locking bar having recesses in which the projections operate composed of broad and narrow spaces and a gage on the end of the locking bar to indicate the correct positions for locking the various combinations.

38. The combination in a voting machine, of a plurality of indicators, a progressively movable locking bar therefor adapted when moved in one direction to unlock, then lock and again unlock said indicators for voting operation.

39. The combination in a voting machine having indicators and a main resetting bar therefor, of a plurality of indicators, a plurality of bars to reset said indicators, each of said bars being connected to the main resetting bar of the machine, projections on said bars, a recessed bar with which said projections engage and by means of which said resetting bars are locked against movement.

40. The combination in a voting machine, of a plurality of indicators arranged in a row, a plurality of bars to reset said indicators, independent means to hold said bars in their reset position, said means controlling said bars in a plurality of combinations.

41. The combination in a voting machine, of a series of interlocking straps, a single counterbalanced resetting bar coöperating therewith.

42. The combination in a voting machine, of a plurality of movable interlocking devices, a vertically movable resetting bar, means for automatically raising said bar and means for positively lowering it.

43. The combination in a voting machine, of a plurality of movable interlocking devices, a vertically movable resetting bar, springs for automatically raising said bar and means for positively lowering it.

44. In a voting machine, the combination of a register, a pallet bar therefor having its end extending in an angle to the plane of the bar, an indicator having a shoulder and a hook for engagement with said end.

45. The combination in a voting machine of a series of ballot indicators arranged in parallel rows, interlocking devices between them, a shaft capable of oscillation extending transversely to said interlocking devices, said wings being each adjustable to a forward or back position on said shaft without engaging with said interlocking devices, said wings when in a forward position being turned into and out of engagement with said devices by the oscillation of said shaft.

46. The combination in a voting machine, interlocking devices having suitable engaging portions thereon, a shaft, wings independently adjustable thereon toward and away from said interlocking devices without engaging therewith, said shaft being capable of oscillation whereby the oscillation of said shaft will bring the adjusted wings into locking engagement with the interlocking devices.

47. The combination in a voting machine of interlocking devices for a plurality of single candidate groups, a single channel interlocking said devices, a shaft capable of oscillation, means secured thereon and capable of being positioned thereon toward or away from said interlocking devices without engaging therewith, said means when in forward position engaging with and locking said interlocking devices when said shaft is oscillated in one direction.

48. The combination in a voting machine of a plurality of series of interlocking devices, one for each single candidate group, all interlocking in a single channel, a shaft extending parallel to said channel, and means mounted on said shaft for engaging said devices by groups to lock them, said means being adjustable on the shaft without engaging with said interlocking devices, said adjusted means only being movable with the shaft into locking position to engage with and lock said interlocking devices.

49. The combination in a voting machine, of a plurality of series of interlocking devices, one for each single candidate group, all interlocking in a single channel, a shaft extending parallel with said channel, a series of wings secured thereon, one for the interlocking devices of each single candidate group, said interlocking devices having portions with which said wings can engage, said wings being separately adjustable forward or back on said shaft without engaging with said interlocking devices, said wings when adjusted forward only serving to engage with and lock their respective interlocking devices when the shaft is rotated forward.

50. The combination in a voting machine of a plurality of series of interlocking devices, one for each single candidate group, all interlocking in a single channel, a single locking bar for locking said interlocking devices, a shaft extending parallel with said channel, a series of wings mounted on said shaft and adjustable thereon forward and back toward said interlocking devices without engaging therewith, one of said wings for the interlocking devices of each single candidate group, engaging portions on said interlocking devices with which said wings can engage when the wing is placed in operative position and the shaft is rotated to locking position, means for rotating said shaft to locking position, and releasing devices therefor.

51. In a voting machine the combination with the casing having apertures and doors for closing them, of the platen in rear of the aperture, the roll shaft in rear of said platen having the slotted ends, the pivoted pins extending transversely of the shaft and adapted to engage the slots in the shaft, said pins having the transversely-extending portions.

52. The combination in a voting machine, of ballot indicators arranged in a plurality of party rows, interlocking devices for said indicators, a traveler operating in stationary guides coöperating successively with the indicators in one of said party rows, the operation of which causes all keys in said row that are not previously interlocked to be moved to voted position.

53. In a voting machine the combination with candidate ballot indicators arranged in party rows, locking devices for the indicators, straight ticket indicators adapted when actuated to release the candidate indicators and operate a number of them to voted position, interlocking devices between the candidate indicators and a traveler operating in stationary guides for successively operating to voted position those indicators in a row which have not been arrested by the interlocking devices.

54. The combination in a voting machine of ballot indicators arranged in a plurality of parallel party rows, interlocking devices for said indicators, a track adjacent to one of said party rows, a traveler mounted thereon, a spring pressed finger on said traveler operating on the indicators of said party row when the traveler moves along its track, causing those that are not interlocked to move to voted position.

55. In a voting machine, the combination with a plurality of individual candidate ballot indicators, a plurality of straight ticket ballot indicators, and locking devices for preventing the separate operation of the individual indicators, of a movable member, actuated by the movement of any of the straight ticket keys and controlling the locking devices.

56. In a voting machine, the combination with a plurality of separate ballot indicators one for each candidate, of a movable device coöperating with the indicators separately and successively to operate them to voted position by a single movement in one direction and yielding connections between said device and the indicators.

57. In a voting machine, the combination with a plurality of separate ballot indicators one for each candidate and arranged in party rows, of a movable part or member coöperating with separate indicators successively to operate them to voted position and yielding connections between said member and the indicators.

58. In a voting machine, the combination with the separate ballot indicators one for each candidate, of a plurality of operating devices one for the indicators devoted to the candidates of each party and each coöperating with its indicators successively when moved in one direction and yielding connections between said member and the indicators.

59. In a voting machine the combination with a plurality of ballot indicators, registers therefor, a resetting bar for the indicators having a longitudinal and lateral movement, of a plurality of straight ticket indicators, a locking bar for securing it, operated upon by any of the straight ticket indicators to release the resetting bar and means for moving the said resetting bar.

60. In a voting machine the combination with a plurality of ballot indicators, a resetting bar for the indicators and actuating devices for moving said bar in one direction only, of a locking device for said resetting bar, a plurality of straight ticket indicators for moving to voted position a plurality of ballot indicators and connections between said straight ticket indicators and the locking device for causing the release of the resetting bar prior to the operation of the ballot indicators.

61. In a voting machine, the combination with a plurality of registers, a corresponding plurality of ballot indicators movable into and out of coöperative relation with the registers without operating them, and operating mechanism for causing the operation of the registers whose indicators are left in voted position, of a resetting mechanism for the indicators, connections between said resetting mechanism and the operating mechanism for causing the movement of the former in one direction only, locking devices for the resetting mechanism and means separate from the operating devices for releasing said locking devices.

62. In a voting machine, the combination with a plurality of registers, a corresponding plurality of ballot indicators movable into and out of coöperative relation with their registers without operating them, and operating mechanism for causing the operation of the registers whose indicators are left in voted position, of a resetting mechanism for the indicators, connections between it and the operating mechanism for causing the movement of the former in one direction only, locking devices for the resetting mechanism, and means for operating to voted position a plurality of indicators, said means coöperating with the locking device to release the resetting mechanism.

63. In a voting machine, the combination with ballot indicators, a resetting device therefor, a lock for the resetting device, of means for operating the resetting device in one direction and connections between said means and the lock for releasing the latter after a predetermined movement in the opposite direction.

64. In a voting machine, the combination with ballot indicators, a resetting device therefor, and a locking device for said resetting device, of means for operating the resetting device to return the indicators when operated in one direction, said means coöperating with the locking device to release the resetting device when moved in the opposite direction.

65. In a voting machine, the combination with ballot indicators, a resetting device therefor, and a lock for the resetting device, of means for operating the resetting device to reset the indicators when moved to one position and releasing the resetting device when moved to another position, additional locking devices for the resetting device and means for operating a plurality of ballot indicators to voted position coöperating with said additional locking devices to release it.

66. In a voting machine, the combination with ballot indicators, straight ticket devices for operating a plurality of said indicators to voted position, a lockout device for preventing the operation of some of said indicators, and a movable member coöperating with all the indicators, of a locking device for said member adapted to be released by operating the straight ticket devices and also by lockout device.

67. In a voting machine, the combination with ballot indicators, a member adapted to be actuated by any of them, and means for operating said member in one direction.

68. In a voting machine the combination with ballot indicators, straight ticket devices for operating a plurality of indicators to voted position and a lockout device for preventing the operation of some of said indicators, of a member or part controlling the movement of all of the indicators, means for operating it in one direction, and two separate locking devices for said member, one actuated by both the straight ticket device and the lockout device and the other released by the operating means for the member.

69. In a voting machine, the combination with ballot indicators, a member controlling their movement, a plurality of straight ticket devices each adapted to operate a plurality of indicators to voted position, a movable universal locking bar coöperating with the controlling member and a stationary stop for arresting its movement, said universal bar being operable by some of the straight ticket devices to disengage it from the controlling member device and operable by others of the straight ticket devices to disengage it from the stationary stop.

70. In a voting machine, the combination with ballot indicators, a member controlling their movement, straight ticket devices each adapted to operate a plurality of indicators to voted position, a laterally and longitudinally movable universal locking bar coöperating with the controlling member to lock it, a stop with which said locking bar coöperates, said locking bar being operated laterally by some of the straight ticket devices to release it from the stop and by others to release it from the controlling member.

71. In a voting machine, the combination with ballot indicators, a member controlling their movement, straight ticket devices each adapted to operate a plurality of indicators to voted position, a laterally and longitudinally movable universal locking bar coöperating with the controlling member to lock it, a stop with which said bar coöperates to prevent its longitudinal movement, said bar being operated by the straight ticket devices to release it from the stationary stop and also to release it from the controlling member and means for returning bar to normal locking position.

72. In a voting machine, the combination with ballot indicators and a bar coöperating therewith to control their movement, of the locking bar 49 engaging the controlling bar, the guides 51 and 52 for the bar, the stop 55 with which said bar 49 engages and means for operating the bar 49 laterally to disengage it from the stop 55 or the controlling member.

73. In a voting machine, the combination with the ballot indicators and a bar coöperating therewith to control their movement, of the locking bar 49 having the notch and projection 50, the stop 55, the guides 51 and 52, the spring operating the bar 49 laterally and means for operating the bar laterally at either end.

74. In a voting machine, the combination with ballot indicators and the controlling member coöperating therewith, of the locking bar 49 engaging the controlling member, the stop 55 engaged by the bar and means for operating the bar 49 laterally to release it from the stop or the controlling member, the bar 22 for actuating the controlling member and a lever 158 operating in the controlling member and operated in one direction by the bar 22.

75. In a voting machine, the combination with ballot indicators of a laterally and longitudinally movable controlling member coöperating therewith, said member operating the indicators when moved laterally, and means for locking the bar when moved laterally and longitudinally in one direction.

76. In a voting machine, the combination with ballot indicators, of a laterally and longitudinally movable resetting bar coöperating therewith, said bar coöperating with the indicators when moved laterally in one direction, relatively stationary means for securing the bar from lateral movement at one end when coöperating with the indicators and separate locking means for preventing said bar from longitudinal movement.

77. In a voting machine, the combination with ballot indicators, of a movable bar coöperating with the indicators, means for causing the simultaneous lateral and longitudinal movements of the bar, said lateral movement in one direction causing it to coöperate with the indicators, means for operating said bar in opposite directions and separate locking means for holding the bar when engaged with the indicators.

78. In a voting machine, the combination with ballot indicators, of a movable bar coöperating with the indicators, cams for causing its lateral and longitudinal movement, and an engaging projection for preventing its lateral movement at one end when moved longitudinally in one direction and a separate locking device for preventing its lateral movement at the opposite end.

79. In a voting machine, the combination with ballot indicators, of a movable bar cooperating with the indicators, having the cam surface at one end and the projection at the other, stationary projections with which said cam surface and projection engage, and a locking device for preventing the lateral movement of the end of the bar.

80. In a voting machine, the combination with ballot indicators, a laterally movable resetting bar coöperating with the indicators, longitudinally movable bars coöperating with said resetting bar to operate it in one direction only and means for actuating the last mentioned bars.

81. In a voting machine, the combination with ballot indicators, a laterally movable resetting bar coöperating with the indicators and means for operating said bar in one direction only to release the indicators, of two longitudinally movable bars engaging the ends of the resetting bar and operating it in the opposite direction to reset the indicators, an oscillatory operating shaft and connections between it and the last mentioned bars.

82. In a voting machine, the combination with a casing, ballot indicators operable from the exterior thereof, a barrier for preventing access to the indicators and an operating device therefor, of a laterally movable resetting bar coöperating with the indicators and arranged within the casing, longitudinally movable bars for engaging the resetting bar at separated points and moving it in one direction only, and connections between said bars and the barrier operating device.

83. In a voting machine, the combination with the casing, ballot indicators operable from the exterior thereof, a barrier preventing access to the indicators and an operating device therefor, of a support, registers thereon arranged within the casing with which the indicators are adapted to coöperate when left in voted position, a resetting bar coöperating with the indicators, bars engaging the resetting bar and operating it in one direction only, and connections between said last mentioned bars, the register support and the barrier operating device for causing their simultaneous operation when the latter is moved in one direction.

84. In a voting machine, the combination with the casing, ballot indicators operable from the exterior thereof, a barrier preventing access to the indicators, an operating shaft therefor, links connected to the shaft, the depending rods or bars and the levers connected to the links and bars, of an indicator resetting bar with which the depending bars coöperate to move it in one direction only.

85. The combination in a voting machine, of a plurality of indicators, a resetting and locking bar therefor, a plurality of means for holding said bar in locking position and means for successively disengaging said means.

86. The combination in a voting machine, of a plurality of interlocking straps, a resetting bar engaging therewith, a plurality of means for holding said bar in locking position, means operated by the machine for successively disengaging a plurality of said locking means.

87. The combination in a voting machine, of a plurality of indicators, a resetting and locking bar therefor, means for holding said bar in locking position after the withdrawal of the means operating to reset said bar.

88. The combination in a voting machine, of a plurality of indicators, a resetting and locking bar therefor, means for holding said bar in locking position after the withdrawal of the means operating to reset said bar, means for subsequently releasing said locking means.

89. The combination in a voting machine, of a plurality of interlocking rods or straps, a resetting bar therefor, means for moving said bar to resetting position, means for holding said bar locked after the withdrawal of said first mentioned means and means for subsequently releasing said locking means.

90. The combination in a voting machine, of a plurality of indicators, a resetting bar therefor, operating and locking means for said bar, said locking means holding the bar locked after the operating means has released the bar, and means for subsequently releasing said bar from said locking means.

91. In a voting machine the combination with the casing and operating mechanism therein, of two hinged doors for controlling access to the interior thereof, arranged with their free edges in juxtaposition when closed, a perforated bar at their meeting edges, locking rods pivoted to one of the doors and corresponding loops on the other door through which and the perforated bar the rods extend when the doors are closed.

92. In a voting machine the combination with the casing and operating mechanism therein of a door permitting access to the interior of the casing hinged at its upper edge and having the locking and supporting rods pivoted thereto, the recesses in the casing with which the rods engage to secure the door, and the movable stirrups with which the ends of the rods are adapted to be engaged to hold the door in open position.

93. A voting machine comprising indicators, interlocking rods controlled thereby, each having a shoulder and a rock shaft having a plurality of sleeves mounted thereon and independently adjustable around the same, each sleeve being provided with a shoulder adapted, when said sleeves are suitably adjusted and the rock shaft is actuated to lie in the path of the shoulders of the corresponding locking rods and prevent their operation.

94. In a voting machine, the combination with the interlocking or key stop members for preventing the simultaneous actuation of more than one candidate-selecting member in a multi-office group, candidate-selecting members grouped according to parties and coöperating with the key-stop members, and means forming part of the machine for setting all the candidate-selecting members of any party *seriatim* by a single movement.

95. In a voting machine, the combination with the candidate keys arranged in party columns and office groups, of key stop members coöperating therewith for preventing the simultaneous actuation of more than one key in a multi-office group, and a member forming part of the machine adapted to be moved over all the keys of any party column at a single motion to operate all of them *seriatim*, for the purpose described.

96. In a voting machine, the combination with the candidate keys arranged according to parties, of the interlocking or key stop members for preventing the simultaneous action of more than one key in a multi-office group, and a member forming a part of the machine adapted to be moved over said keys at a single motion to depress all the keys of a certain party *seriatim*, for the purpose described.

97. The combination in a voting machine of a lockout, comprising an oscillating shaft, wings mounted on said shaft and independently adjustable thereon to either of a plurality of positions, and means for holding said wings in either of said positions.

98. The combination in a voting machine of a lockout, comprising an oscillating shaft, wings mounted on said shaft and independently adjustable thereon to either of a plurality of positions, means for holding said wings in either of said positions, and means for oscillating said shaft.

99. The combination in a voting machine of a series of ballot indicators arranged in parallel rows, interlocking devices between said indicators, a shaft capable of oscillation extending transversely to said interlocking devices, wings independently adjustable to a plurality of positions on said shaft, means for holding said wings in either of said positions, said shaft when oscillated being capable of bringing the wings set in one position into engagement with the interlocking devices therefor.

100. The combination in a voting machine of a plurality of series of interlocking devices, one for each single candidate group, all interlocking in a single channel, a shaft extending parallel with said channel, a series of wings adjustably secured thereon, said wings being capable of being placed in a plurality of positions on said shaft, means for holding said wings in either of said positions, one of said wings being provided for the interlocking devices of each single candidate group, said interlocking devices having engaging portions with which said wings can engage, means for rotating said shaft to cause all of said wings set in one position to engage with their respective interlocking devices and lock said interlocking devices and their indicators against operation.

101. The combination in a voting machine of a lockout, comprising an oscillating shaft, wings mounted on said shaft and independently adjustable thereon to either of a plurality of positions, means for holding said wings in either of said positions during the oscillation of said shaft, and means for oscillating said shaft.

102. The combination in a voting machine of ballot indicators, arranged in party rows, a movable member operating simultaneously upon a plurality of said indicators to move them to voted position, said member causing some of said indicators to move relatively to others of said indicators during said movement.

103. The combination in a voting machine, of an interlocking channel, comprising two U-shaped channel plates facing each other and spaced apart, interlocking blocks carried in said channel, said blocks embracing the inner and outer side of one flange of said channel.

104. The combination in a voting machine, of an interlocking channel, an interlocking block contained therein, said block having an extension embracing the edge of the channel.

105. The combination in a voting machine, of an interlocking channel and interlocking rods or straps, a narrow block operating in said channel, and means for preventing the block from turning.

106. In a voting machine the combination with interlocking rods or straps having wedges thereon, interlocking blocks and guides for said blocks, of the abutments or blocks in the guides consisting of two similar parts having the edges tapering toward each other and means for securing said abutments.

107. In a voting machine the combination with interlocking rods or straps having wedges thereon, interlocking blocks, and guides for said blocks, of the abutments consisting of two similar parts having the edges tapering toward each other, and the compensating strips adapted to be inserted between the parts of the abutments.

108. In a voting machine the combination with the channel plates, the interlocking blocks arranged between them having the slots at their upper side edges in which the edges of the channel plates engage, and interlocking rods coöperating with the blocks.

109. In a voting machine the combination with the channel plates, the interlocking blocks therein and the abutments having the slots at the edges coöperating with the edges of the channel plates, means for securing the abutments and interlocking rods or straps coöperating with the blocks.

ALFRED J. GILLESPIE.

Witnesses:
G. WILLARD RICH,
ELIZABETH J. PERRY.

Copies of this patent may be obtained for five cents each, by addressing the "Commissioner of Patents, Washington, D. C."